(12) United States Patent
Joshi

(10) Patent No.: US 11,327,877 B2
(45) Date of Patent: May 10, 2022

(54) PIPELINE PERFORMANCE IMPROVEMENT USING STOCHASTIC DAGS

(71) Applicant: Microsoft Technology Licensing, LLC, Redmond, WA (US)

(72) Inventor: Vinod Joshi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 16/870,069

(22) Filed: May 8, 2020

(65) Prior Publication Data
US 2021/0349814 A1 Nov. 11, 2021

(51) Int. Cl.
*G06F 8/70* (2018.01)
*G06F 11/36* (2006.01)
*G06F 8/77* (2018.01)
*G06F 8/71* (2018.01)
*G06F 8/60* (2018.01)

(52) U.S. Cl.
CPC ............ *G06F 11/3688* (2013.01); *G06F 8/70* (2013.01); *G06F 8/60* (2013.01); *G06F 8/71* (2013.01); *G06F 8/77* (2013.01)

(58) Field of Classification Search
CPC .......... G06F 11/3688; G06F 8/70; G06F 8/71; G06F 8/60; G06F 8/77
See application file for complete search history.

(56) References Cited

U.S. PATENT DOCUMENTS

| | | |
|---|---|---|
| 6,339,838 B1 | 1/2002 | Weinman, Jr. |
| 8,086,467 B2 | 12/2011 | Jin et al. |
| 8,126,649 B2 | 2/2012 | Frasch et al. |

(Continued)

OTHER PUBLICATIONS

Wei Zheng et al., A Randomization Approach for Stochastic Workflow Scheduling in Clouds, Hindawi Publishing Corporation Scientific Programming, vol. 2016, retrieved online on Aug. 26, 2021, pp. 13. Retrieved from the Internet: <URL: https://downloads.hindawi.com/journals/sp/2016/9136107.pdf>. (Year: 2016).*

(Continued)

*Primary Examiner* — Hanh Thi-Minh Bui
(74) *Attorney, Agent, or Firm* — Ogilvie Law Firm

(57) ABSTRACT

Software development pipeline tools construct pipelines by combining tools, files, and other resources, to build, integrate, test, deploy, or otherwise implement operational functionality in computing systems. Some pipelines are simple, but others are stochastic due to conditional execution, task addition or removal, resource availability randomness, and other causes. Some stochastic pipelines also include a hierarchy with multiple levels of task groupings, which adds complexity. Pipeline performance optimization uses critical paths, but critical paths are challenging to identify in stochastic pipelines. Tools and techniques are presented to automatically identify likely or actual critical paths and to indicate constituent critical tasks as improvement options for stochastic pipelines in software development or other industrial activities. Pipeline representations include directed acyclic graph data structures of constituent tasks. Computationally applying relevance filters helps identify performance improvement options based on historic execution data, without requiring the predefined task dependency information that stochasticity prevents.

20 Claims, 9 Drawing Sheets

(56) References Cited

U.S. PATENT DOCUMENTS

| | | | |
|---|---|---|---|
| 8,311,850 | B2 | 11/2012 | Johnson et al. |
| 8,392,234 | B2 | 3/2013 | Ma et al. |
| 8,407,081 | B1 | 3/2013 | Rajasenan |
| 8,856,018 | B2 | 10/2014 | Lu et al. |
| 8,959,370 | B2 | 2/2015 | Zomaya et al. |
| 9,020,829 | B2 | 4/2015 | Li et al. |
| 9,076,116 | B2 | 7/2015 | Furbeck et al. |
| 9,135,401 | B2 | 9/2015 | Zhan et al. |
| 9,727,829 | B2 | 8/2017 | Bollapragada et al. |
| 10,310,896 | B1 | 6/2019 | Kichak et al. |
| 10,504,044 | B2 | 12/2019 | Johnson et al. |
| 2020/0192994 | A1* | 6/2020 | Gupta ............... G06F 11/3466 |

OTHER PUBLICATIONS

Aravind Vasudevan and David Gregg, Mutual Inclusivity of the Critical Path and its Partial Schedule on Heterogeneous Systems, Jan. 30, 2017, retrieved online on Dec. 17, 2021, pp. 1-19. Retrieved from the Internet: <URL: https://arxiv.org/pdf/1701.08800.pdf>. (Year: 2017).*

Gaudio, Alex, "stolos/README.md", Retrieved From: https://github.com/sailthru/stolos/blob/master/README.md, Nov. 24, 2015, 25 Pages.

Lebeuf, et al., "Understanding, Debugging, and Optimizing Distributed Software Builds: A Design Study", In Proceedings of International Conference on Software Maintenance and Evolution, Sep. 23, 2018, pp. 496-507.

"International Search Report and Written Opinion issued in PCT Application No. PCT/US21/020978", dated Jun. 18, 2021, 13 Pages.

Steve Burton, "Can you apply Machine Learning to Continuous Delivery?", retrieved from <<https://harness.io/2017/11/can-apply-machine-learning-continuous-delivery/>>, Nov. 2, 2017, 12 pages.

Wei Zheng, et al., "Stochastic DAG scheduling using a Monte Carlo approach", retrieved from <<http://rpc273.cs.man.ac.uk/jpdc13.pdf>>, Oct. 17, 2012, 17 pages.

"The entire DevOps lifecycle in one application.", retrieved from <<https://about.gitlab.com/stages-devops-lifecycle/>>, no later than Mar. 9, 2020, 7 pages.

"CloudBees DevOptics", retrieved from <<https://www.cloudbees.com/products/devoptics/overview>>, no later than Mar. 9, 2020, 6 pages.

"The best CI/CD for building fast.", retrieved from <<https://circleci.com/>>, no later than Mar. 9, 2020, 7 pages.

"Free & open source ci/cd server", retrieved from <<https://www.gocd.org/>>, no later than Mar. 9, 2020, 5 pages.

"Why Electric Cloud", retrieved from <<https://electric-cloud.com/>>, no later than Mar. 9, 2020, 6 pages.

Burton, Steve, "Can You Apply Machine Learning to Continuous Delivery?", retrieved from <<https://harness.io/2017/11/can-apply-machine-learning-continuous-delivery/>>, Nov. 2, 2017, 10 pages.

* cited by examiner

PIPELINE PERFORMANCE IMPROVEMENT USING STOCHASTIC DAGS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Software development and other industrial activities are sometimes complex, so they may be divided into smaller tasks. In some cases, tasks can proceed in any order, but sometimes one task relies on a result of another task. For planning and execution such interdependent tasks may be placed in a partial ordering relative to each other, which is sometimes called a "pipeline", to indicate which tasks are to be completed before which other tasks. Sometimes multiple tasks rely on the same limited resource or the same personnel, which the tasks can only use one task at a time, or perhaps only a few tasks at a time. In some cases, tasks can be performed in an overlapping or completely parallel manner. Thus, a pipeline may show that some tasks will be executed partly or entirely in parallel and other tasks are to be executed sequentially.

Various tools and techniques have been devised and used in attempts to determine what orders a set of tasks can be done in, and to figure out which of the possible orderings is fastest or least expensive. Attention has also been given to ascertaining how individual tasks contribute to an overall cost, which may be measured as elapsed time, personnel time, equipment or raw material or power or other resource usage, and using other metrics.

SUMMARY

Some embodiments described in this document provide improved technology for identifying particular tasks whose optimization will also optimize one or more pipelines, in stochastic situations where pipelines evolve and are not necessarily known fully before they execute. Software development provides examples of such situations, but the teachings herein may be applied in other contexts as well.

Some embodiments automatically identify likely or actual critical tasks in stochastic pipeline environments, thereby identifying pipeline performance improvement options in software development and delivery or other industrial activities. Embodiments may thus provide a better alternative than approaches that rely on knowing in advance of a pipeline's execution at least the approximate cost of all tasks in the pipeline, and also rely on knowing in advance the ordering in the pipeline of all the tasks.

Some embodiments use or provide a pipeline performance improvement hardware and software combination which includes a digital memory, digital representations of stochastically constructed software development pipelines, and a processor which is in operable communication with the memory. The pipeline representations reside in the memory (which may include a mix of volatile and non-volatile memory). Each representation includes a directed acyclic graph of constituent tasks of a respective pipeline. In these examples, each pipeline is configured for executing software development operations.

In these embodiments, the processor is configured, e.g., by tailored software, to perform certain steps for identifying one or more pipeline performance improvement options. The steps include (a) selecting multiple improvement-relevant representations from the obtained representations by applying at least one improvement-relevance representation filter to at least a portion of the obtained representations, (b) for each representation R in a plurality of the selected improvement-relevant representations, identifying a critical path of the pipeline which is represented by R, and (c) indicating at least one critical task. The critical task is a pipeline improvement option, in that the critical task is located on at least one critical path of at least one pipeline, and in that a performance improvement of the pipeline is dependent upon a performance improvement of the critical task. However, one of skill will understand that because of stochasticity, it is not absolutely guaranteed that optimizing a critical task will also optimize a given pipeline execution.

Some embodiments use or provide a method for identifying one or more performance improvement options in a group of stochastically constructed software development pipelines. This method includes: obtaining digital representations of stochastically constructed software development pipelines, each representation including a directed acyclic graph of constituent tasks of a respective pipeline, each pipeline configured for executing software development operations; selecting multiple improvement-relevant representations from the obtained representations by applying at least one improvement-relevance representation filter to at least a portion of the obtained representations; for each representation R in a plurality of the selected improvement-relevant representations, identifying a critical path of the pipeline which is represented by R; and indicating at least one critical task. The indicated critical task is a pipeline improvement option, in that the critical task is located on at least one critical path of at least one pipeline, and in that a performance improvement of the pipeline is dependent upon a performance improvement of the critical task.

More generally, some embodiments use or provide a computer-readable storage medium configured with data and instructions which upon execution by a processor cause a computing system to perform a method for identifying one or more performance improvement options in a group of stochastically constructed pipelines. This method includes: obtaining digital representations of stochastically constructed pipelines, each representation including a directed acyclic graph of constituent tasks of a respective pipeline, each pipeline configured for executing industrial operations; selecting multiple improvement-relevant representations from the obtained representations by applying at least one improvement-relevance representation filter to at least a portion of the obtained representations; for each representation R in a plurality of the selected improvement-relevant representations, identifying a critical path of the pipeline which is represented by R; and indicating at least one critical task. The indicated critical task is a pipeline improvement option, in that the critical task is located on at least one critical path of at least one pipeline, and in that a performance improvement of the pipeline is dependent upon a performance improvement of the critical task.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
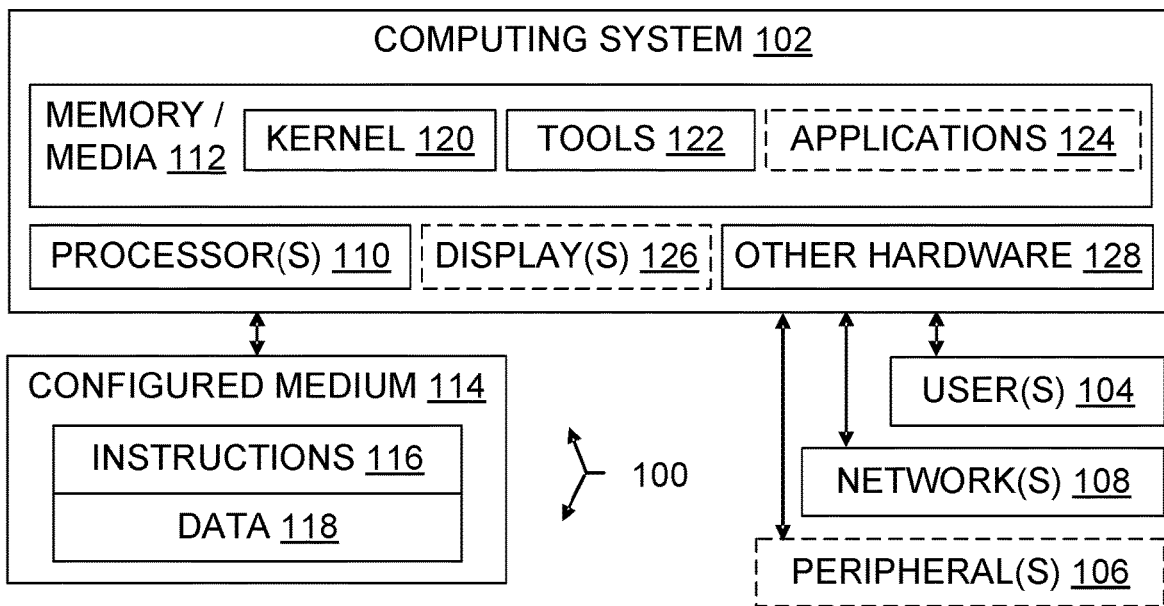
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by a Microsoft innovator who was working on technology to help improve the performance of DevOps pipelines. The term "DevOps" comes from "development" and "operations", and refers generally to tools and techniques which provide or support an agile integrated relationship between software development and the daily operation of developed and deployed software. As used herein, DevOps encompasses variations such as DevSecOps, which is DevOps with heightened attention to security, and NetOps, which is DevOps with heightened attention to networking.

In particular, a technical challenge was to how to automatically identify the critical path of a pipeline 214 when the pipeline is stochastic 222. A critical path is a path whose constituent tasks' performance directly impacts the overall pipeline performance. Automation taught herein addresses the large amount of data and enormous number of task orderings possible in actual stochastic pipelines; when dozens of tasks are involved, doing computations accurately, comprehensively, and efficiently by hand is not feasible. Pipeline stochasticity also creates technical problems that are not adequately addressed by automated statistical tools such as PERT tools and CPM tools.

PERT is an acronym for program (or project) evaluation and review technique. A PERT tool may be viewed as a statistical tool suitable for use in some project management scenarios. PERT is sometimes used to analyze and represent the tasks involved in completing a given project.

CPM is an acronym for critical path method. CPM or similar efforts are sometimes referred to as critical path analysis (CPA). CPM may be viewed as an algorithm for scheduling a set of project activities.

In scenarios applying PERT and CPM, task dependencies and task durations are largely or fully predefined, as opposed to being constructed based primarily or solely on historical pipeline execution data. Although PERT may consider a Worst, Average, and Best scenario for its approximations, in practice the variability considered with PERT is very low compared to the actual execution time variances in some industrial pipelines, and in particular in some software development pipelines. Additionally, PERT and CPM operate on a simplified network, whereas in many scenarios of interest here a pipeline execution has a multi-level hierarchy.

With the benefit of hindsight informed by teachings provided herein, one of skill would acknowledge these technical challenges. A DevOps pipeline can grow to be complex over time, more so with the continuously increasing size of a code base or a test bed used by the pipeline. This complexity can result in higher execution times, impacting the overall DevOps efficiency. In a pipeline with multi-level, distributed, and stochastic execution flow, it can be quite challenging to identify the tasks that are critical for pipeline performance optimization.

Teachings herein include a computer-implementable framework for identifying the critical path in a distributed stochastic directed acyclic graph (DAG). This framework can be used by DevOps teams to understand the tasks on the critical path whose optimization will cause improvements in the execution times of the pipeline. With a less effective approach, it is very possible to reduce the time of a given task without necessarily reducing overall pipeline execution time, so identifying the critical tasks as taught here is worthwhile despite the effort needed to overcome the technical challenges and the possibility that a task which is identified as critical by the framework will not necessarily in fact be critical for every execution of a stochastic pipeline, due to the stochasticity of the pipeline.

One internal prototype which applies some of the teachings presented herein automatically handled the stochastic and distributed nature of execution in a cloud-based DevOps scenario, reducing or avoiding the overhead of manual attempts at optimization. The framework is not limited to cloud-based DevOps; it can be used with on-premise networks and it can be adapted for use with any pipeline based on DAGs, including in particular repository-based DevOps using GitHub® (mark of GitHub, Inc.), BitBucket® (mark of Atlassian Pty Ltd), SourceForge® (mark of SourceForge Media, LLC), or other repository software. In one test, the framework reduced the number of tasks for observation to 50, down from a total of 551 tasks in the pipeline execution.

Other aspects of these embodiments, and other pipeline performance enhancement embodiments, are also described herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud or enterprise network. In particular, pipeline improvement functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

In many software-related industries, configurable and flexible execution pipelines are used to build, test, and deploy various software artifacts at scale. The configurability and flexibility allow constituent tasks of the pipeline to execute in different orders, depending on when required resources become available, the need for parallelism and on whether other conditions are met. But configurability and flexibility also make it difficult to know whether reducing the time spent executing a particular task will also reduce the overall execution time of pipelines that include the task. Indeed, in many pipelines and for many tasks, reducing individual task execution times will not reduce overall pipeline execution time. Advantageously, some embodiments described herein identify one or more tasks whose individual performance improvements will also improve the performance of stochastic pipelines that include any of those tasks.

Figure 2:
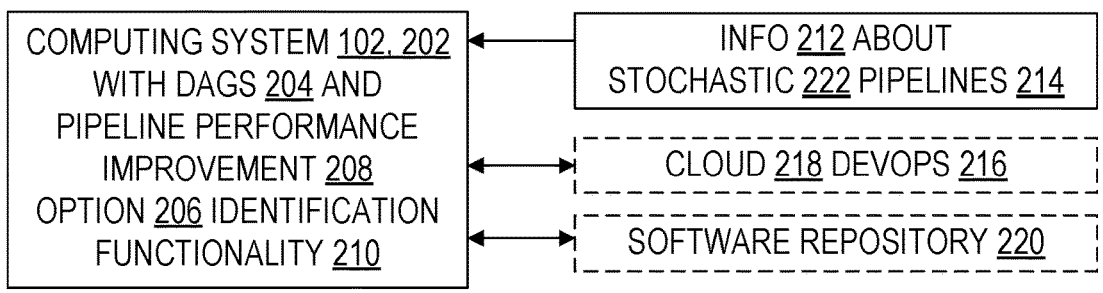
FIG. 2 is a block diagram illustrating a computing system equipped with pipeline performance improvement option identification functionality, and some aspects of a surrounding context.

FIG. 2 illustrates an environment having an enhanced system 202, 102 that includes stochastic 222 pipeline DAGs 204 which are utilized as taught herein to identify options 206 for pipeline performance improvement 208. Software which analyzes the DAGs and other information 212 about stochastic 222 pipelines 214 to find critical tasks provides the system 202 with pipeline performance improvement option identification functionality 210. As used herein, "critical task" is understood to mean "a task which is likely or actually critical based on historic execution data of a stochastic pipeline".

In some embodiments, the system 202 does its part by identifying improvement options 206 (e.g., critical tasks) and then other systems 102 may be automatically or manually controlled to select among the options and to make performance improvements. In other embodiments, the system 202 itself automatically selects one or more options. In some, the system 202 itself automatically makes performance improvements, e.g., by allocating faster or additional processor 110 cores or memory 112 to a critical task.

The pipeline improvement functionality 210 may be applied to stochastic pipelines 214 in a variety of industrial environments. In particular, some suitable software development environments may include DevOps environments 216, which may be in a cloud 218 or another network 108, as well as software development environments that utilize a software repository 220. One of skill will understand that some environments are both cloud-based and in communication with a software repository.

Figure 3:
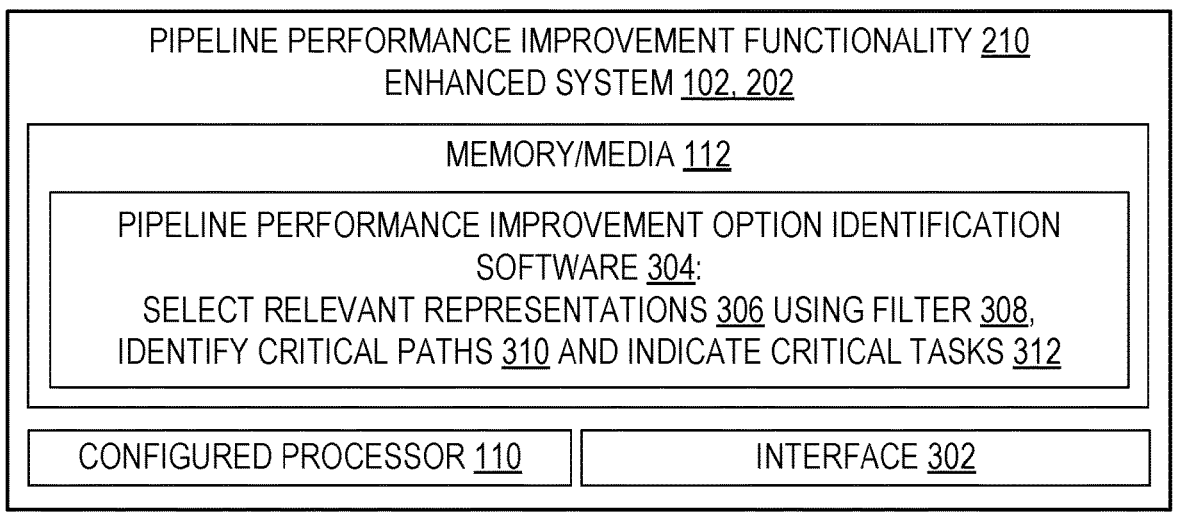
FIG. 3 is a block diagram illustrating an enhanced system configured with pipeline performance improvement option identification functionality.

FIG. 3 illustrates an enhanced system 202 which is configured with functionality 206 for performing pipeline improvement option identification. The system 202 may be networked generally or communicate in particular (via network or otherwise) with other pipeline software (e.g., build software, deployment software, repository software) through one or more interfaces 302. The system 202 may execute within a virtual machine or container. The illustrated system 202 includes pipeline improvement option identification software 304 to perform computations that select relevant digital representations 306 of stochastic pipelines using relevance filters 308, identify critical paths 310, and indicate critical tasks 312, 502 within a critical path. For example, the software 304 may perform a method 1500 illustrated in FIG. 14 or FIG. 15 or both.

Figure 4:
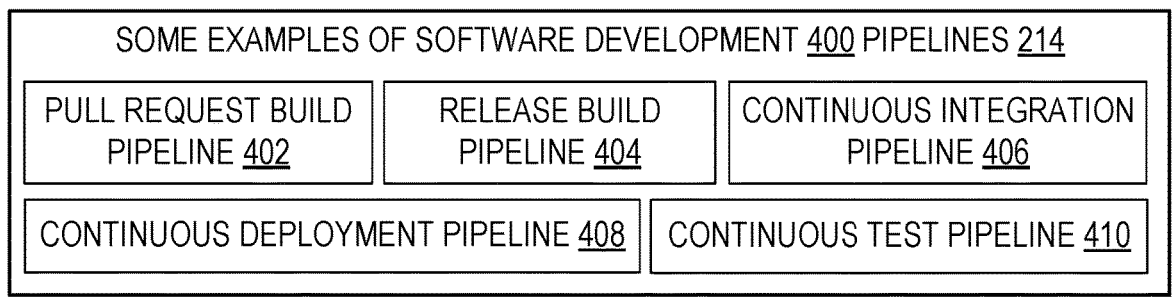
FIG. 4 is a block diagram illustrating some examples of software development pipelines.

FIG. 4 illustrates several examples of pipelines 214 that may be used in software development 400. These pipelines 214 have basic forms that are familiar to one in the art, but may be enhanced by the addition of integrated pipeline improvement functionality 210. Unless stated otherwise, reference to the enhanced versions is intended herein. The particular kinds of pipelines shown are discussed at various points herein, and additional details regarding them are provided in the discussion of a List of Reference Numerals later in this disclosure document.

Figure 5:
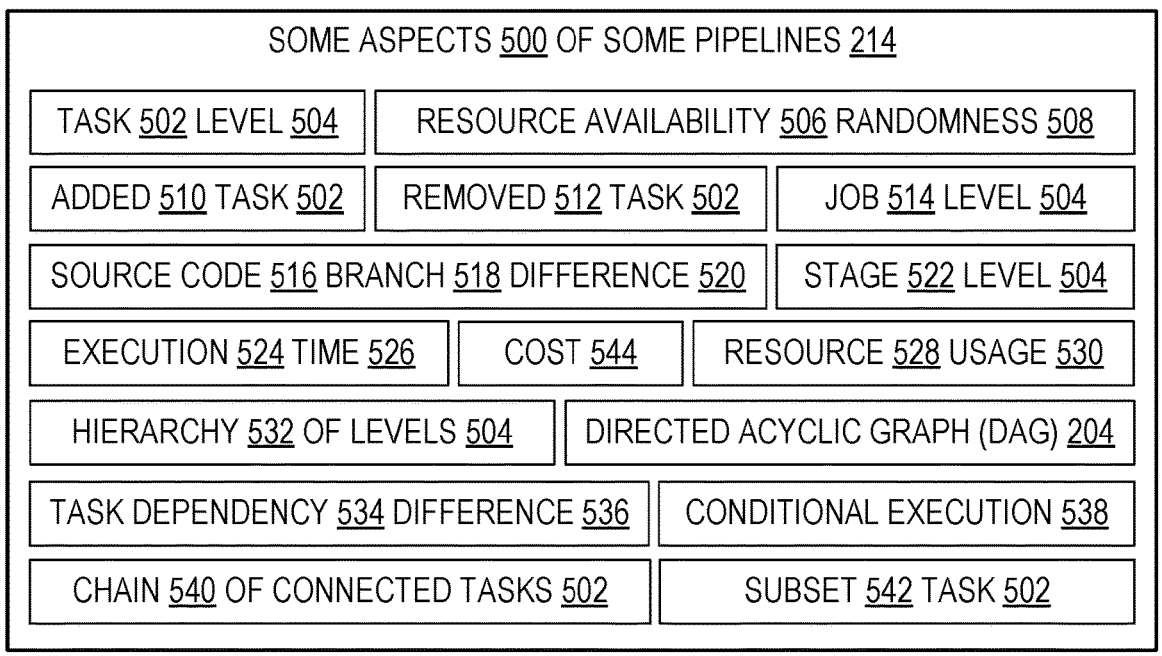
FIG. 5 is a block diagram illustrating some aspects of some pipelines.

FIG. 5 illustrates several aspects 500 of pipelines 214 that may be used in industry. The particular aspects shown are discussed at various points herein, and additional details regarding them are provided in the discussion of a List of Reference Numerals later in this disclosure document.

Some embodiments use or provide a functionality-enhanced system, such as system 202 or another system 102 that is enhanced as taught herein. In some embodiments, a system which is configured for identifying one or more performance improvement options in a group of stochastically 222 constructed software development pipelines includes a digital memory 112, digital representations 306 of stochastically constructed pipelines, and a processor 110 in operable communication with the memory. Each pipeline representation 306 resides in the memory 112, and each representation includes at least a directed acyclic graph 204 of constituent tasks 502 of a respective pipeline 214. A representation 305 may also include, e.g., level 504 information, historic execution 524 information, and metadata. Each pipeline in this example is configured for executing software development 400 operations, but the teachings may be adapted for use in other industrial contexts.

In this embodiment, the processor 110 is configured to perform steps for identifying one or more pipeline performance improvement options 206, e.g., critical tasks 312, 502. Options 206 may highlight particular aspects 500 of critical tasks, such as execution time 526 or resource usage 530. The steps include (a) selecting multiple improvement-relevant representations 306 from the obtained representations by applying at least one improvement-relevance representation filter 308 to at least a portion of the obtained representations, (b) for each representation R in a plurality of the selected improvement-relevant representations, identifying a critical path 310 of the pipeline which is represented by R, and (c) indicating at least one critical task 312, e.g., by displaying it to a user or by passing its identifier to a kernel scheduler with a request for increased processor power or memory. The critical task is a pipeline improvement option 206, in that the critical task is located on at least one critical path 310 of at least one pipeline 214. The critical task is also a pipeline improvement option 206 in that a performance improvement 208 of the pipeline is dependent upon a performance improvement 208 of the critical task.

In some embodiments, the stochastically constructed software development pipelines 214 include at least one of the following: a pull request build pipeline 402, a continuous integration pipeline 406, a continuous test pipeline 410, a release build pipeline 404, or a continuous deployment pipeline 408. Any of these pipelines may be enhanced by adding pipeline performance improvement option identification as a task 502, either as an initial task, or at other points, e.g., before each stage 522 or even before each job 514.

In some embodiments, the system 202 executes inside 1510 or in communication with 1512 a version-controlled software repository 220. In some, the system 202 executes inside 1510 or in communication with 1512 a cloud-based DevOps environment 216.

Figure 7:
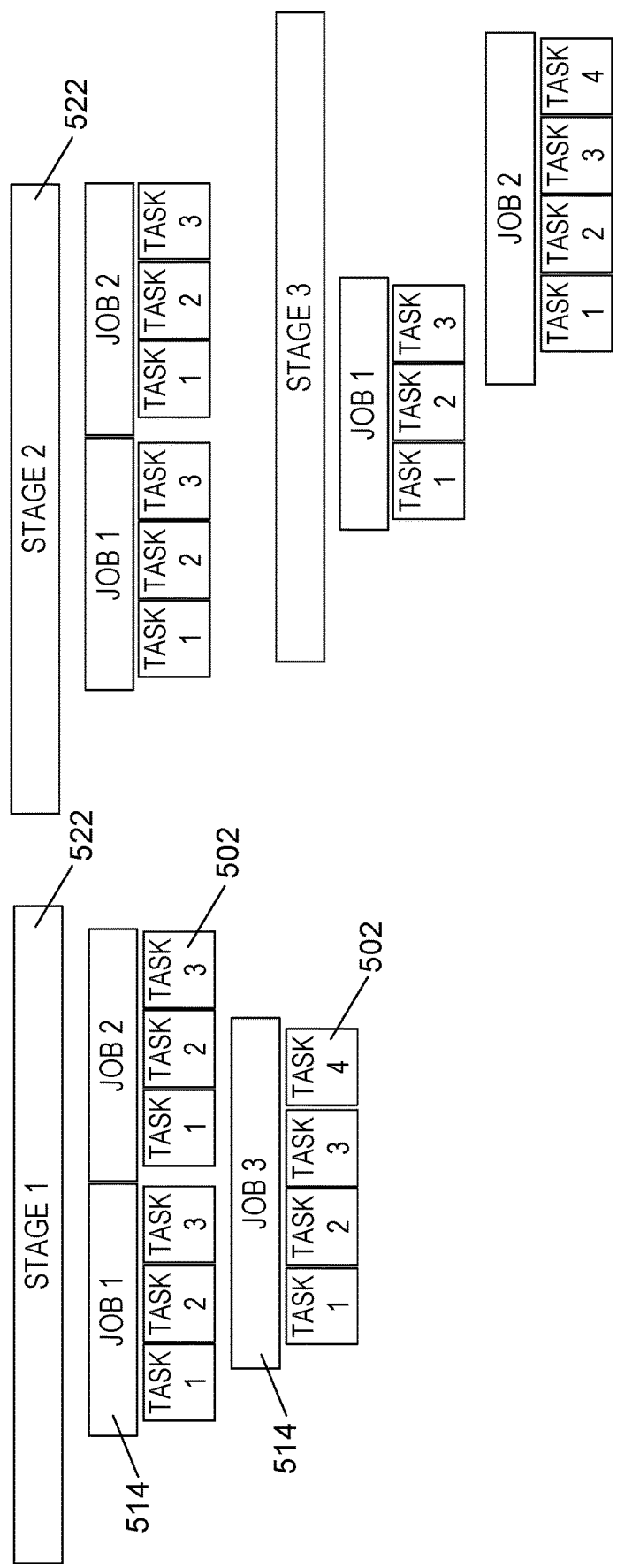
FIG. 7 is an example pipeline diagram illustrating pipeline execution flow.

In some embodiments, at least one of the stochastically constructed software development pipelines 214 has a hierarchy 532 of levels 504, including at least one level that is above a task level that contains tasks 502 of the pipeline. For example, FIG. 7 shows a hierarchy 532 that includes a stage 522 level 504 above a job 514 level 504, both of which are above a task 502 level 504. Of course, the particular labels "stage", "job", and "task" are not inherent parts of the functionality 210, and embodiments may have one or more levels which have any comprehensible terms used as respective identifiers.

Several examples of kinds of stochasticity involve aspects 500. For instance, in some embodiments at least two of the stochastically constructed pipelines 214 differ 1524 from one another due at least in part to at least one of the following aspects: resource availability 506 randomness, conditional execution 538, task addition 510, task removal 512, a difference in task dependency 534, or use of a different branch 518 of source code 516. As to words resource availability 506 randomness, for instance, two pipelines may be different from one another because a required or preferred resource 528 became available at different points along the paths taken by the pipelines. One pipeline may also be formed from another by adding 510 or removing 512 a task, or by executing different code 518 in a script, makefile, project control file, or other source 516. These are examples; a person of skill informed by the teachings herein will recognize these and other causes of stochasticity in pipelines.

Other system embodiments are also described herein, either directly or derivable as system versions of described processes or configured media, duly informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different pipeline application areas, pipeline aspects, technical features, interface or operation mechanisms, sequences, data structures, or functionalities for instance, and may otherwise depart from the examples provided herein.

Processes (a.k.a. Methods)

Figure 14:
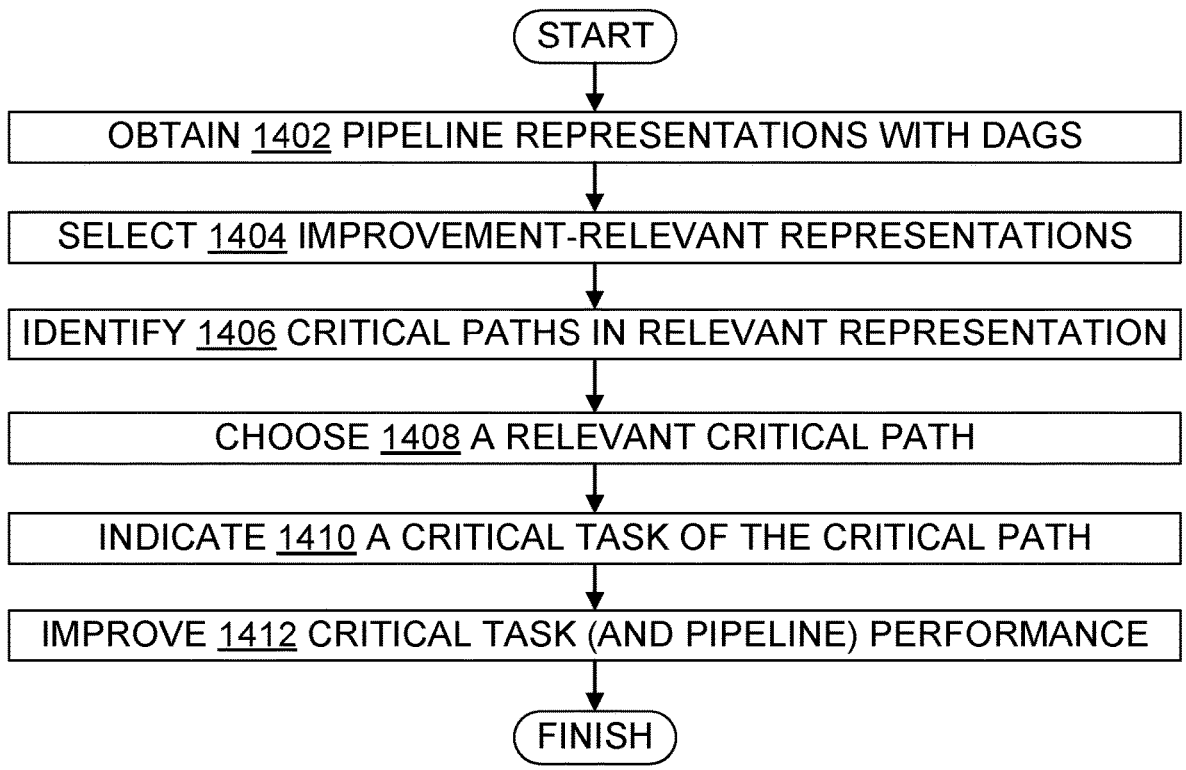
FIG. 14 is a flowchart illustrating steps in some pipeline performance improvement methods.
Figure 15:
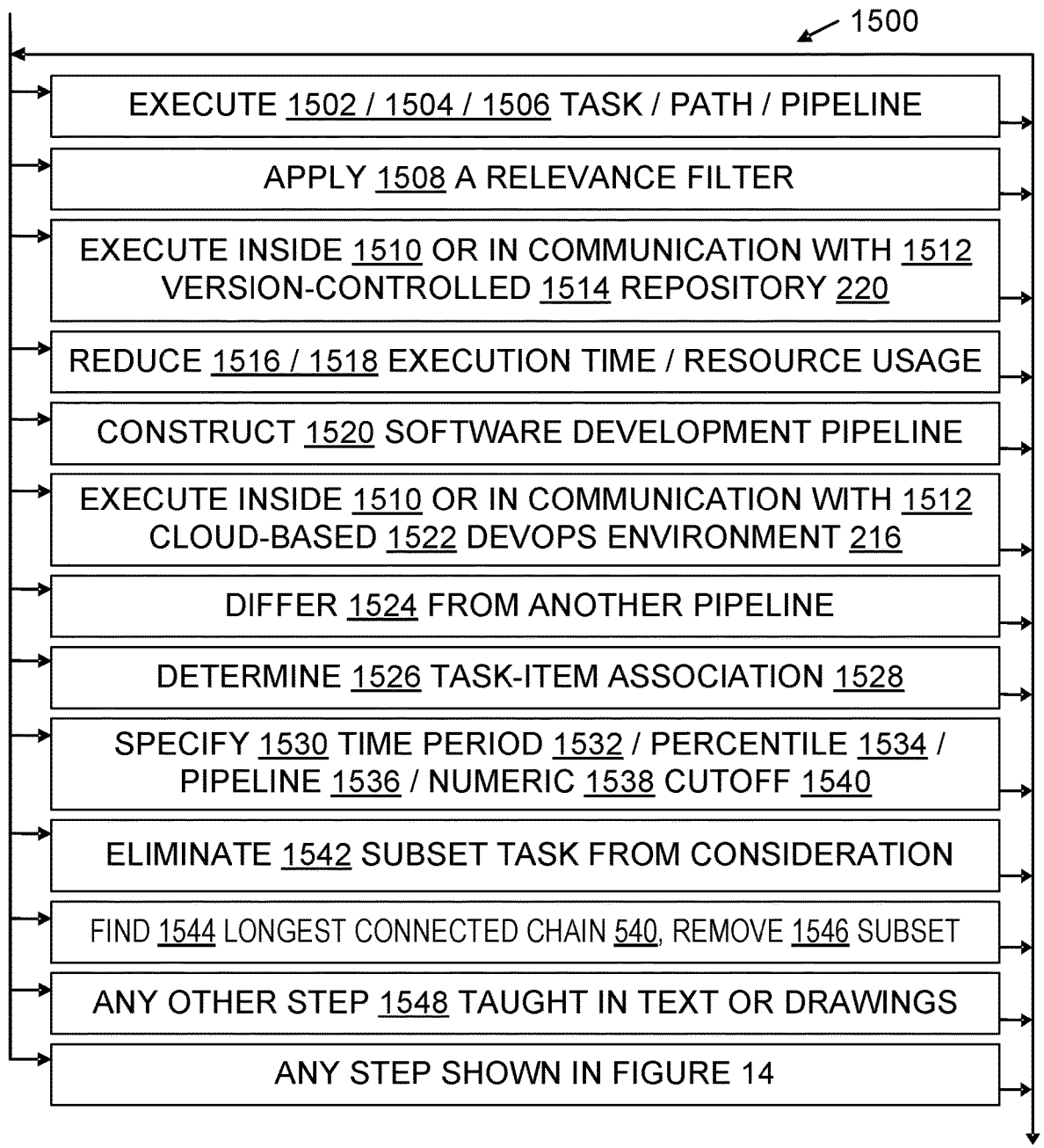
FIG. 15 is a flowchart further illustrating steps in some pipeline performance improvement option identification methods.

FIG. 14 illustrates a family of methods 1400 that may be performed or assisted by an enhanced system, such as system 202 or another functionality 210 enhanced system as taught herein. FIG. 15 further illustrates pipeline improvement option identification methods (which may also be referred to as "processes" in the legal sense of that word) that are suitable for use during operation of a system which has innovative functionality taught herein. FIG. 15 includes some refinements, supplements, or contextual actions for steps shown in FIG. 14. FIG. 15 also incorporates steps shown in FIG. 14.

Technical processes shown in the Figures or otherwise disclosed will be performed automatically, e.g., by an enhanced system 202 or software component thereof, unless otherwise indicated. Processes may also be performed in part automatically and in part manually to the extent action by a human administrator or other human person is implicated, e.g., in some embodiments a human developer or engineer may specify which indicated critical task(s) 502 will be optimized. No process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 14 and 15. Steps may be performed serially, in a partially overlapping manner, or fully in parallel. In particular, the order in which flowchart 1400 action items or flowchart 1500 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method 1500 for identifying one or more performance improvement options 206 in a group of stochastically constructed software development pipelines 214, including the following automatic steps: obtaining 1402 digital representations 306 of stochastically constructed software development pipelines, each representation including a directed acyclic graph 204 of constituent tasks 502 of a respective pipeline, each pipeline configured for executing 524 software development operations; selecting 1404 multiple improvement-relevant representations 306 from the obtained representations by applying 1508 at least one improvement-relevance representation filter 308 to at least a portion of the obtained representations; for each representation R in a plurality of the selected improvement-relevant representations 306, identifying 1406 a critical path 310 of the pipeline which is represented by R; and indicating 1410 at least one critical task 312, the critical task being a pipeline improvement option, in that the critical task is located on at least one critical path 310 of at least one pipeline, and in that a performance improvement 208 of the pipeline is dependent upon a performance improvement 208 of the critical task.

In some embodiments, the method further includes at least one of the following: improving 1412 performance of the pipeline by reducing 1516 execution time 526 of the critical task, or improving 1412 performance of the pipeline by reducing 1518 usage 530 of a computational resource 528 by the critical task.

In some embodiments, the method includes choosing 1408 a critical path from among the identified 1406 critical paths by applying 1508 at least one critical path relevance filter 308. Once the critical path is identified for each of the relevant DAG(s), there is a possibility that the sequence of these critical task varies across few groups of instances. In this case again, one may identify the critical tasks using the most executed, last executed or based on the density of execution using a specific percentile. In an exception scenario where identified relevant DAG(s) have different tasks in the critical paths and there are not enough statistically significant task executions to pick a critical path, the critical path may be determined based on the most frequently executed tasks across all the relevant DAG(s) identified to determine the critical task.

In some embodiments, selecting 1404 multiple improvement-relevant representations 306 includes applying 1508 at least one of the following as an improvement-relevance representation filter 308: the number of instances of a directed acyclic graph 204 within a specified 1530 time period 1532; membership of a directed acyclic graph 204 within a group of directed acyclic graphs which includes the directed acyclic graph of a specified 1530 pipeline 1536, 214; membership of a directed acyclic graph 204 within a group of directed acyclic graphs which includes at least a specified 1530 percentage 1534 of the pipelines which correspond to obtained representations; or membership of a directed acyclic graph within a group of directed acyclic graphs which includes at least a specified 1530 number 1538 of the pipelines which correspond to obtained representations.

In some embodiments, the method enhances 1412 pipeline performance management using stochastic directed acyclic graphs 204 in that a total number of tasks 502 in the selected 1404 improvement-relevant representations 306 is less than one fourth of a total number of tasks 502 in all the obtained representations 306. Other amounts of improvement are also possible, depending on the details of a particular situation.

In some embodiments, at least one of the stochastically constructed software development pipelines 214 has a hierarchy 532 of levels 504 which includes a task level that contains tasks 502 of the pipeline, and the method further includes determining 1526 an association 1528 between the critical task 312 and at least one higher level item in a level that is above the task level. FIGS. 7-10 illustrate three-level (stage, job, task) hierarchies 532, and show association 1528 by placing an associated higher-level item directly above the lower level items associated with it. For instance, in the pipeline on the left side of FIG. 7, four tasks labeled TASK1, TASK2, TASK3, and TASK4 are associated 1528 with the item labeled JOB3. JOB1 and JOB2 similarly each have three associated task items. Note that the item labeled TASK1 in the context of JOB3 could be different in substance than the item labeled TASK1 in the context of JOB2, or the two TASK1 items could be instances of the same substantive operations.

In some embodiments, selecting 1404 multiple improvement-relevant representations includes applying 1508 at least the following as an improvement-relevance representation filter 308: number 1540, 1538 of instances of a directed acyclic graph within a specified time period. In some, selecting 1404 multiple improvement-relevant representations includes applying 1508 at least the following as an improvement-relevance representation filter 308: membership of a directed acyclic graph within a specified 1530 group of directed acyclic graphs.

In some embodiments, the method further includes choosing 1408 a critical path 310 from among the identified 1406 critical paths by performing at least one of the following: eliminating 1542 from consideration a task which is completely a subset 542 of another task within a particular execution instance of a directed acyclic graph; or for a particular task in a directed acyclic graph, finding 1544 a longest connected chain 540 of tasks which include the particular task, and removing 1546 a subset that is defined by the chain.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as DAGs 204, filters 308, critical paths 310 (as digital data structures), critical tasks 312 (as digital data structures), pipelines 214 (as digital data structures), pipeline hierarchies 532 (as digital data structures), and task chains 540, in the form of data 118 and instructions 116, read from a removable storage medium 114 and/or another source such as a network connection, to form a configured storage medium. The configured storage medium 112 is capable of causing a computer system 102 to perform technical process steps for pipeline improvement option identification, as disclosed herein. The Figures thus help illustrate configured storage media embodiments and process (a.k.a. method) embodiments, as well as system and process embodiments. In particular, any of the process steps illustrated in FIG. 14 or 15, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause a computing system to perform a method for identifying one or more performance improvement options in a group of stochastically constructed pipelines. This method includes: obtaining 1402 digital representations 306 of stochastically constructed pipelines 214, each representation including a directed acyclic graph 204 of constituent tasks of a respective pipeline, each pipeline configured for executing industrial operations; selecting 1404 multiple improvement-relevant representations from the obtained representations by applying 1508 at least one improvement-relevance representation filter 308 to at least a portion of the obtained representations; for a particular representation in a plurality of the selected improvement-relevant representations, identifying 1406 a critical path 310 of the pipeline which is represented by the particular representation; and indicating 1410 at least one critical task 312, the critical task being a pipeline improvement option 206, in that the critical task is located on at least one critical path of at least one pipeline, and in that a performance improvement of the pipeline is dependent upon a performance improvement of the critical task.

Some embodiments are further characterized in at least two of the following ways: the stochastically constructed pipelines include a pull request build pipeline 402; the stochastically constructed pipelines include a continuous integration pipeline 406; the stochastically constructed pipelines include a continuous test pipeline 410; the stochastically constructed pipelines include a release build pipeline 404; the stochastically constructed pipelines include a continuous deployment pipeline 408; at least one of the stochastically constructed pipelines executes inside 1510 or in communication with 1512 a version-controlled software repository 220; or at least one of the stochastically constructed pipelines executes inside 1510 or in communication with 1512 a cloud-based DevOps environment 216.

In some embodiments, the method includes at least one of the following: improving 208 performance of the pipeline by reducing 1516 execution time of the critical task, or improving 208 performance of the pipeline by reducing 1518 usage of a computational resource by the critical task.

In some embodiments, the method includes choosing 1408 a critical path from among the identified critical paths.

In some embodiments, performing the method 1500 enhances 1412 pipeline performance management using stochastic directed acyclic graphs in that a total number of tasks in the selected 1404 improvement-relevant representations is less than one eighth of a total number of tasks 502 in all the obtained representations. Other amounts of improvement are also possible, depending on the details of a given situation.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some Observations About DAG Critical Path Identification

Some embodiments use or provide functionality 210 to identify a critical path 310 in a distributed DAG 204. In this context, and to further help various readers gain or refine an understanding of teachings provided in this document, the following observations are offered.

A "task" 502 is the smallest unit of execution in a pipeline 214 for planning, scheduling, or optimization purposes. Tasks can be grouped into higher level objects, e.g., a job 514 or a stage 522, in an execution workflow.

A "critical path" 310 is the longest or otherwise highest cost path in the DAG 204, whose completion is mandatory for completion of the workflow.

"Cost" 544 in this example is the duration 526 of execution 524 of the pipeline and its constituents (e.g., tasks, jobs, stages), but cost may be measured in other metrics, e.g., electrical power, processor cycles, memory bytes, network bandwidth consumption, and so on.

A "pipeline" 214 is a group of one or more stages 522, jobs 514, tasks 502 or other work items executing in a single instance of a workflow.

A "DAG" or "directed acyclic graph" 204 in general computing usage is a graph that is directed and without cycles connecting the other edges. In the present disclosure, a DAG is a digital data structure whose nodes represent work items (e.g., tasks 502) and whose edges represent execution dependencies 534.

A "non-parametric approach" is a statistic or statistical approach that does not require that a population being analyzed meet certain assumptions or have a certain functional form used in parametric approaches. For instance, parametric tests assume that data follows a probability distribution, but non-parametric tests are distribution-free methods without that assumption. Non-parametric tests may be used when the distributional assumptions underlying a parametric test are not met.

A "stochastic" 222 dataset has a random probability distribution or pattern that may be analyzed statistically but may not be predicted precisely.

In conjunction with teachings provided herein and skill in the art, it is apparent that DevOps pipelines can easily grow to be complex over time, more so with the continuously increasing size of the code base. This complexity can result in higher execution times, impacting the overall DevOps efficiency. In a pipeline with multi-level, distributed and stochastic execution flow, it can be quite challenging to identify the tasks that are critical for optimization.

Some teachings provided herein describe a framework 600 for identifying the critical path in a distributed stochastic directed acyclic graph. This framework can be used by DevOps teams to understand which tasks 502 are on a critical path 310 whose optimization will yield improvements in the execution times of the pipeline 214. One approach is built to automatically handle the stochastic and distributed nature of execution, which reduces the manual overhead faced by the engineers 104. The framework is not limited to cloud-based DevOps environments; the framework can be extended to any pipeline based on a DAG, e.g., repository 220 environments. One experimental result showed that a prototype of the framework reduced the number of tasks for observation down to 50 from a total of 551 tasks in a pipeline execution.

An increase in execution times in a frequently executing pipeline can severely impact the overall efficiency of the system. For instance, in a pipeline that executes seven hundred times in a day (one after the other), a mere increase of one minute in the duration can result in a delay of almost twelve hours (11.67 hours) for the seven hundredth instance of execution. FIG. 7 is a representation of a typical multi-stage pipeline in an Azure® DevOps environment (mark of Microsoft Corporation). A task 502 can be grouped into multiple jobs 514, which can be grouped further into stages 522. Stages and jobs can execute sequentially or in parallel. In the FIG. 7 example, Stage 2 and 3 can start after Stage 1, whereas Stage 2 and Stage 3 can run at least partially in parallel.

These stages or jobs could be configured to run as a multi-configuration pipeline, e.g., running respective builds for different operating systems, or items 514, 522 could be used to distribute the workload across multiple machines 102, e.g., by running tests in parallel. The execution is dependent on the availability 506 of the resources 528, which is non-deterministic in nature. Basically, in this example and many real-world scenarios, the precise time of availability of a resource 528 cannot be predicted.

The highly stochastic 222 nature of the execution presents a challenge to optimization effort attempts to derive any meaningful insights that are generically applicable for the pipeline. In order to address this challenge, the framework 600 uses a non-parametric approach to not only select 1404 the most relevant execution flow but also to subsequently identify 1408, 1410 the critical tasks 312, 502 in that flow. The framework 600 works even with the lack of a predefined dependency graph, in part by using the historical executions to identify the relevant relationships.

One aspect of the technical challenges posed by pipeline stochasticity is how to bring some deterministic form to the stochastic nature of execution. In principle at least, it may be useful to identify the most relevant execution path that can serve as the basis for any action. Relevance can be determined in multiple ways and is covered in more details elsewhere herein.

Figure 8:
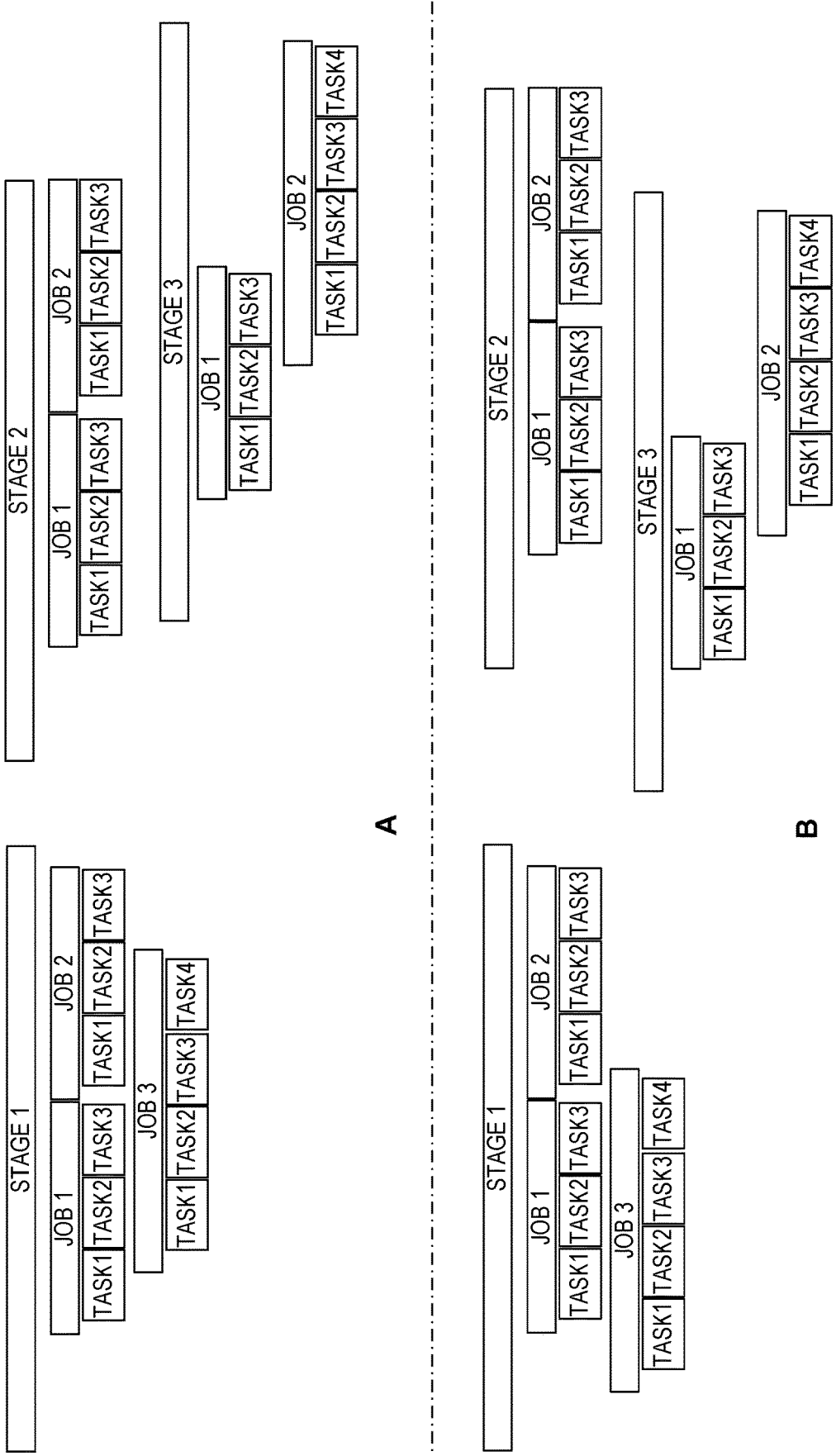
FIG. 8 shows the FIG. 7 pipeline diagram in part A, and shows an alternative pipeline execution flow in part B, to illustrate some aspects of pipeline stochasticity.

FIG. 8 shows two variations of the execution sequence from the multiple possible execution sequences for the FIG. 7 pipeline. Sequence A has Job1 as the starting step as against Job 3 in sequence B, whereas in sequence B Stage 3 starts before Stage 2 as against sequence A which starts with Stage 2.

Another aspect of the technical challenges posed by pipeline stochasticity is conditional execution. Specifically, one faces the challenge of dealing effectively with the randomness caused by conditional execution of tasks, jobs or stages. In some scenarios, the same pipeline 214 can be used to run pull request builds, continuous integration builds, or release candidate builds, based on the input parameters that condition execution. Similar conditional behavior can be observed for tasks, when a task can execute conditionally based on the outcome of a prior step. The flexibility that conditional execution provides tends to add to the complexity of even higher variations in the pipeline execution flow.

Figure 9:
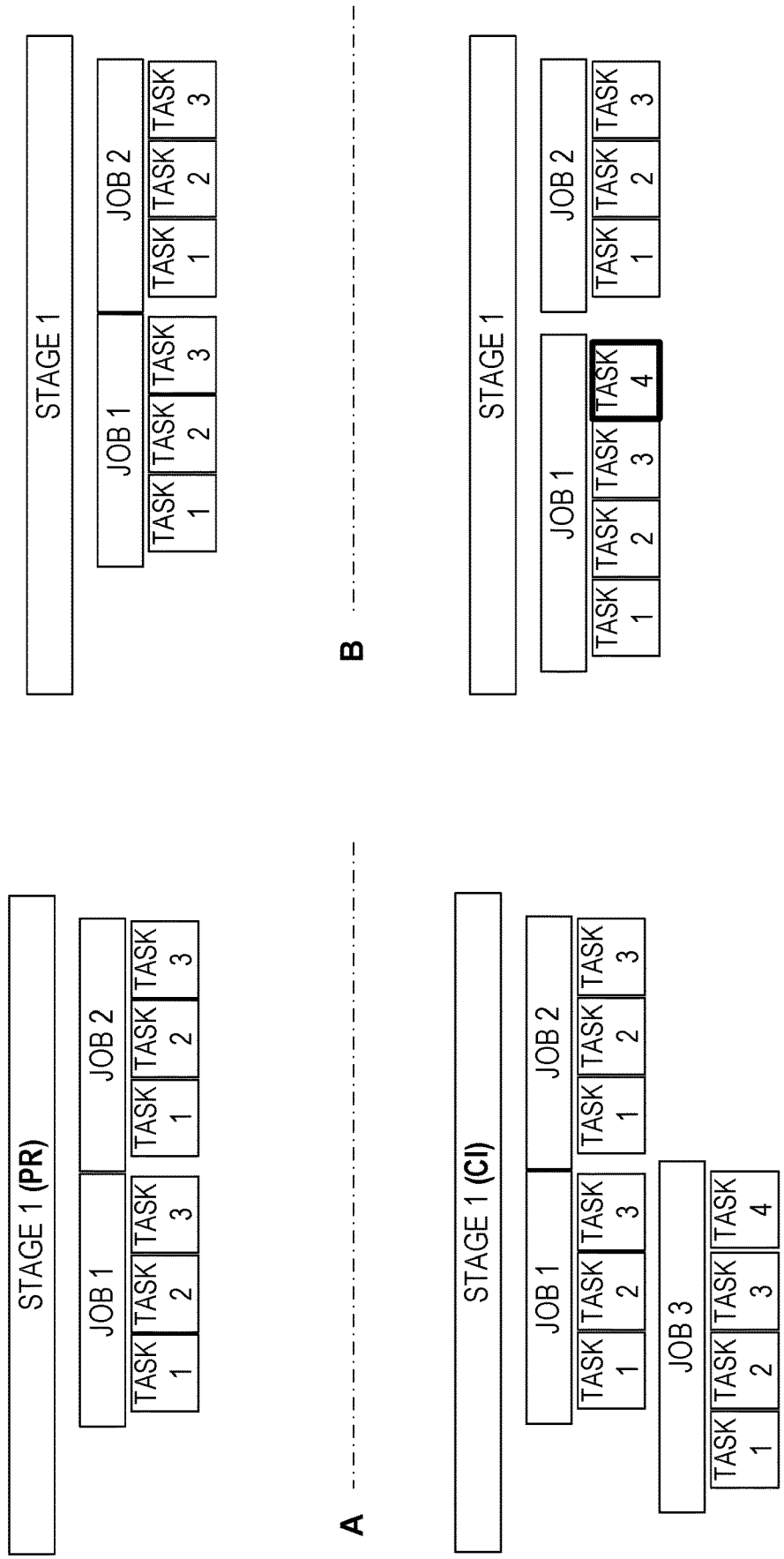
FIG. 9 shows several pipeline diagrams to illustrate pipeline stochasticity due to conditional execution.

In FIG. 9, section A shows the conditional execution of Stage for PR (pull requests) and CI (continuous integration), while section B shows a task (bold outlined Task4) executing conditionally in the same pipeline.

Some embodiments herein highlight and address the lack of a pre-execution dependency graph, which contrasts with non-stochastic pipelines. When the dependency relationship between stages, jobs and tasks is predefined, the relationship can deterministically be embedded in code. However, to address the lack of a dependency graph, a system 202 may infer hidden relationships based on the historical executions 212. This information is not deterministically established, but rather is inferred through selection 1404, identification 1406, choices 1408, and filter application 1508.

Figure 10:
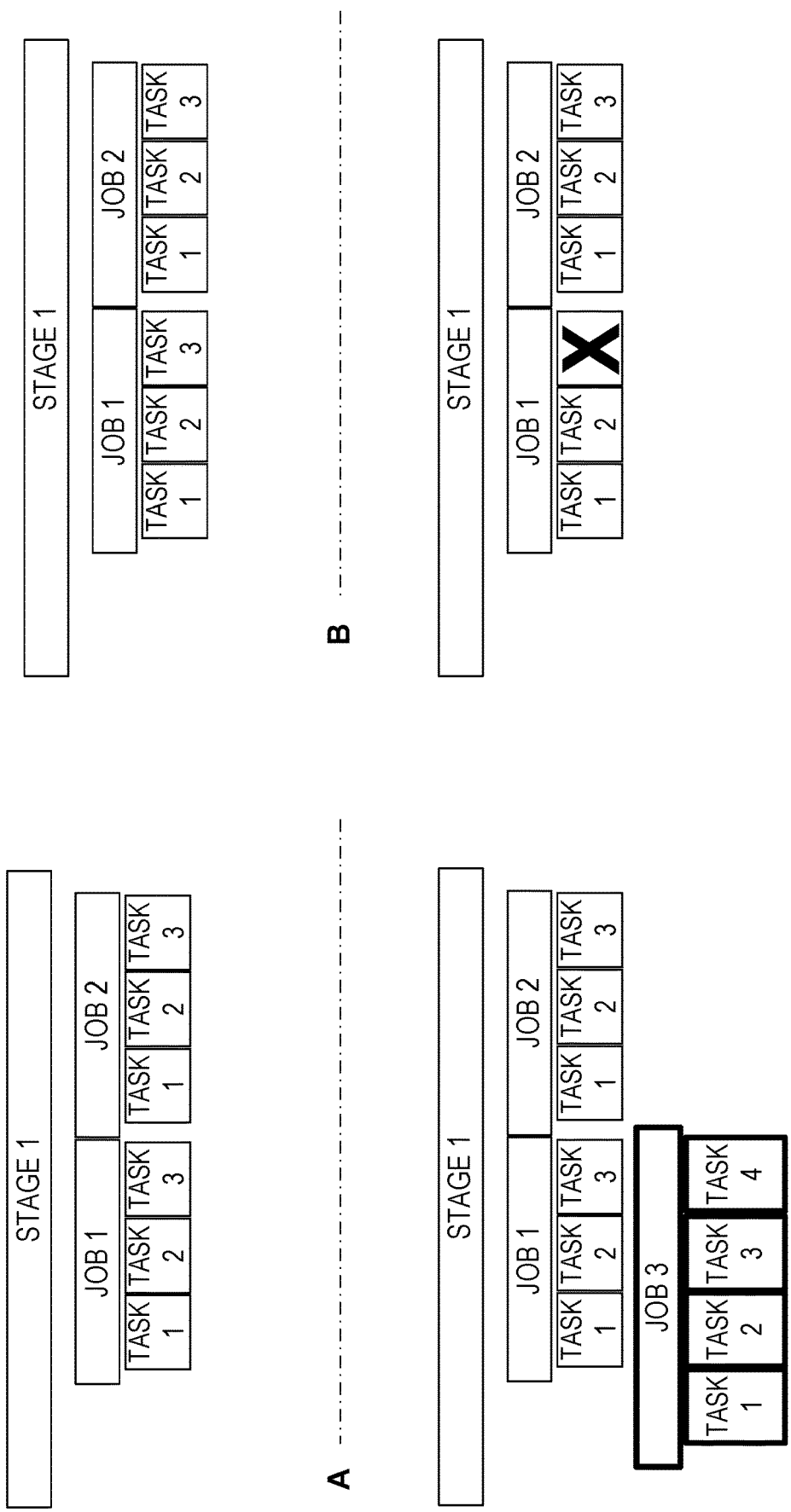
FIG. 10 shows several pipeline diagrams to illustrate pipeline stochasticity in an evolving pipeline.

Another cause of stochasticity 222 in some scenarios is a continuously evolving pipeline. Technical complexity of critical path identification increases with the evolution of a pipeline's definition over time, e.g., due to the addition 510 of a new task, job or stage, or the removal 512 of a task, job, or stage, for example. The possibility of such evolution also means that the shelf life of a critical path determination 1406 is relatively short compared with non-stochastic scenarios. FIG. 10 illustrates an evolving pipeline 214.

Figure 6:
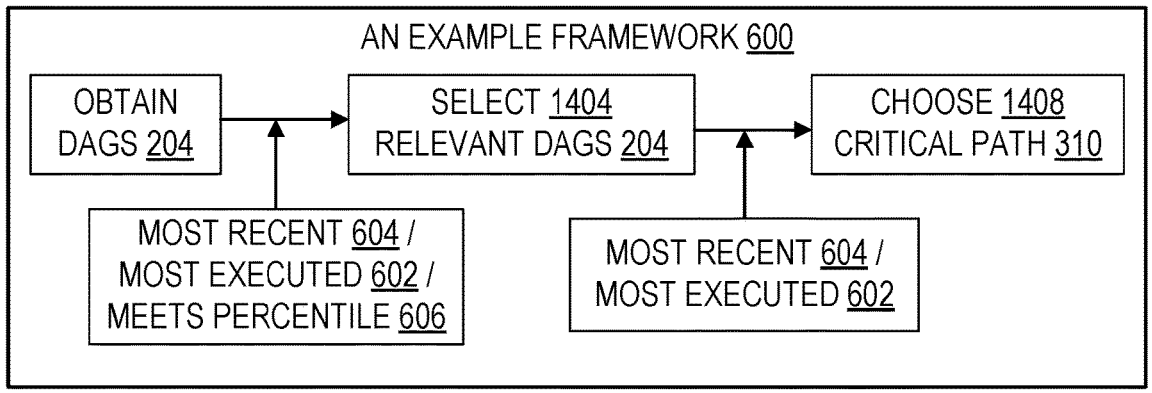
FIG. 6 is a data flow diagram illustrating an example framework for pipeline performance improvement option identification.

FIG. 6 shows the overall structure of a framework 600 for pipeline improvement option identification. From the historical executions, representations containing DAGs 204 are obtained 1402 and from them the most relevant DAGs 204 are selected. Critical paths 310 are chosen 1408 using these DAGs, and then the paths are used to indicate 1410 the critical tasks 312 within them. Each operational phase of the framework 600 is explained in more detail herein. Sample framework 600 implementation code is also provided, with the understanding that embodiments are not limited to the particular code, coding language, identifiers, data structures, or other implementation details provided.

Selecting 1404 DAGs may include identifying all the instances of the DAG(s) executed within a time frame 1532 to be used as a sample for determination of the critical path. In this example selection 1404 picks only the lowest grain in the hierarchy which in this case is tasks 502.

In some embodiments, at any point the association with the higher levels of the hierarchy (e.g., job and stage levels) can be recreated from information 212. A higher grained view may be helpful for navigation in a scheduling or project management tool, for example. While a user would be interested to know which are the tasks that need optimization, they may also often want to know which job or stage includes the task, before taking some optimization actions.

A higher grained view may also be helpful when the critical paths are to be identified across multiple pipelines. In this case someone looking at the overall project can define the grain at a pipeline level to identify the pipelines that are overlapping with each other and which pipelines could or should be optimized to gain overall efficiency in the project. This may be accomplished in a step that reads the task rows, by reading the pipeline related rows as the lowest grain and picking multiple such pipelines across the project executed in a specified window 1532.

The following code illustrates one implementation approach:

```
# create a list to store DAGs
dags = [ ]
# select all tasks from the pipeline execution between selected dates
for dag in PipelineExecution[Type = Task, startDate < taskExecutionDate < endDate]:
    # append to a DAGs array
    dags.append(dag)
```

Selecting 1404 one or more relevant DAGs enables a system 202 to determine a working dependency graph in the absence of any pre-defined relationship. Due to the lack of a conventional predefined dependency graph, the dependency relationship is derived from the historical execution data 212. All tasks in each execution instance of a DAG are sorted based on the increasing order of their execution start time. Each DAG instance is then assigned a hash code based on the cumulative sequence of tasks executed in that instance. Then, based on one of the relevance measures taught herein or another suitable relevance measure, relevant DAG(s) are shortlisted 1404 as a basis for determining a dependency relationship for the pipeline.

The following code illustrates one implementation approach:

```
# select all tasks from shortlisted DAGs ordered based on dagId and task execution start time
for dag in dags[sort by dagId asc, starttime asc]:
    # for each task in a single dag instance
    If(dag[index, dagId] == dag[index-1, dagId]:
        # create a rolling hash of the DAG
        dag[index, Hash] = hash(dag[index, TaskId] + dag[index-1, Hash]
    Else:
        # initialize hash of the new DAG
        dag[index, Hash] = hash(dag[index, TaskId])
```

Selection 1404 can bring determinism to the stochastic nature of the execution. Since there is not much predictability to the order of execution, the system 202 picks 1404 the most relevant representation of the execution from all available DAG instances. With the DAG(s) dependency graph available and a hash assigned to each DAG instance based on the dependency graph, the system 202 groups the DAG(s) instances together based on the hash similarity. Then, based on one of the relevance measures the system 202 picks a set of DAG(s) that are representative of the population.

The following code illustrates one implementation approach:

```
# select relevant DAGs based, e.g., on 'Most Executed', 'Most Recent' or
'Specific Density'
relevantDags = relevance(Type, dags)
```

Selection 1404 can simplify the complexity that is due to distributed multi-level hierarchical execution. Since the system 202 uses the leaf node to determine the dependency graph and relevant DAG(s), it reduces or avoids the complexity that may otherwise come in play if the multi-level hierarchy and distributed execution information is retained in the model. Information 212 about the task can be used at any point to reconstruct 1526 the association 1528 with the higher-level items such as job and stage. Similarly, since a task 502 is the only tangible unit of execution, the complexity of distributed execution is deferred to be handled during the identification 1406 of critical path(s).

In some embodiments, relevance can be determined in one of the following ways.

One relevance category (a.k.a. kind or type) is most executed 602. To apply 1508 most executed 602 as a relevance filter 308, the system 202 picks the group of DAG(s) instances that executed the most in a specified window of observation.

The following code illustrates one implementation approach:

```
# Most Executed
relevance(Type = 'MostExecuted', dags)
{
    _hash = dags.groupby(Hash).count( ).max( )
    return(dags[Hash = _hash]
}
```

Another relevance category is most recently executed 604, also referred to as most recent 604. To apply 1508 most recent 604 as a relevance filter 308, the system 202 picks the group of DAG(s) instances that are part of the same group as the most recently executed DAG. A group may be defined based on the similarity of the DAG(s). In order to determine the similarity of the DAG(s) a system 202 may use a rolling hash of the task for a particular DAG and then compare the final hash across multiple such DAG(s) for matching purposes.

The following code illustrates one implementation approach:

```
# Most Recent
relevance(Type = 'Recent', dags)
{
    _hash = dags.max(dagId)
    return(dags[Hash = _hash]
}
```

Another relevance category is meets percentile 606, also referred to as meets percentage 606 or density 606. To apply 1508 meets percentile 606 as a relevance filter 308, the system 202 picks the group of DAG(s) instances that cover a percentile threshold 1534 specified 1530, starting with the latest execution and working backwards. This threshold may be a percentile of the number of DAG(s) execution currently available to the system 202. One might choose 90% of the DAG execution as a baseline, for example, since there might be outliers within the DAG(s) that are not truly representative of the overall executions.

The following code illustrates one implementation approach:

```
# Density (percentile)
relevance(Type = 'Density', dags)
{
    _hash = dags.percentile(80)
    return(dags[Hash = _hash]
}
```

With respect to identifying 1406 a critical path 310, recall that the critical path may be understood as the longest path in DAG execution that is required for pipeline success. "Longest" in many scenarios also means the path with highest duration of execution. Once the relevant DAG(s) have been selected 1404, each DAG instance is processed to identify 1406 the critical path for that instance. With a set of critical path(s) for all the relevant DAG(s), the system 202 can choose 1408 the most relevant critical path from the set. Relevance can be determined by applying 1508 one or more filters 308.

Figure 11:
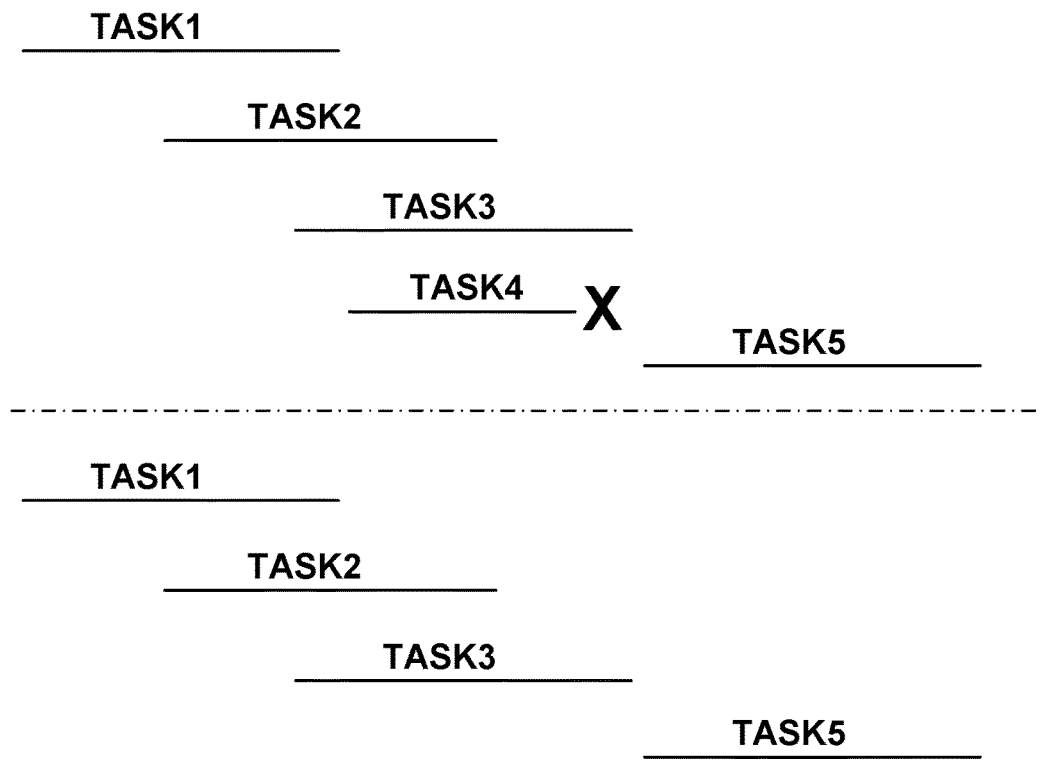
FIG. 11 is a task diagram illustrating elimination of a task that is completely a subset of another task.

In some embodiments, identification 1406 of the critical path involves the following steps. A first step is to eliminate 1542 any task which is completely a subset 542 of another existing task within the same instance of execution of DAG. This is illustrated in FIG. 11 by the elimination 1542 of TASK4 which is a subset of TASK3.

The following code illustrates one implementation approach:

```
subsetDags = relevantDags.join(relevantDags[dagId]).select(left.starttime
  < right.starttime & left.finishtime > right.finishtime)
relevantDags = relevantDags – subsetDags
```

Figure 12:
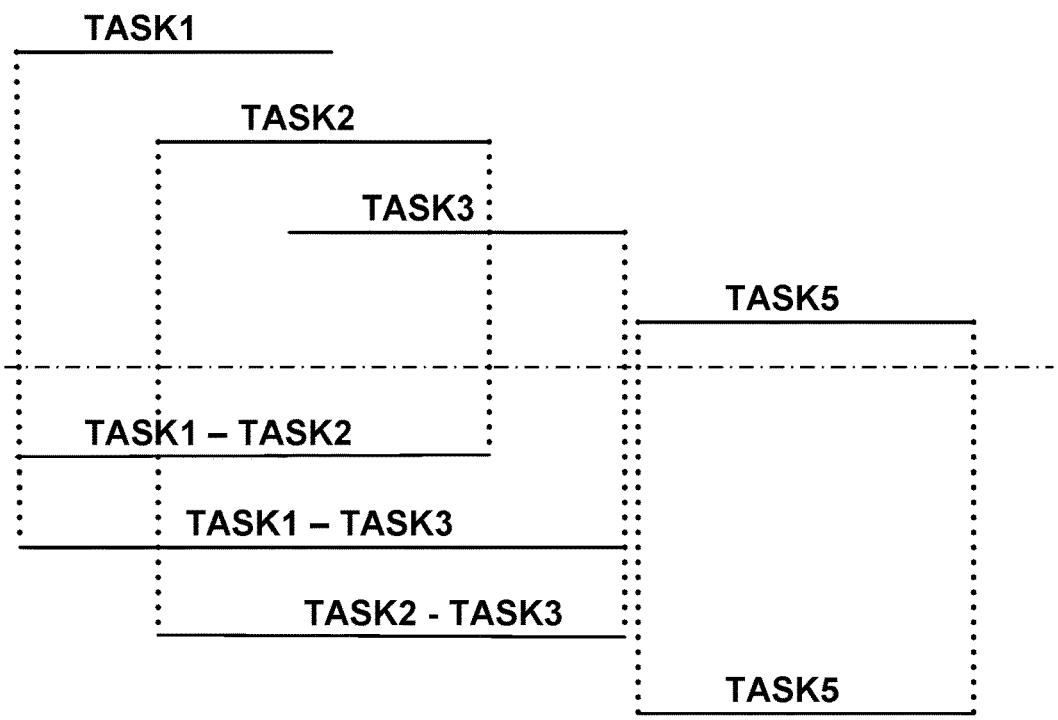
FIG. 12 is a task diagram based on FIG. 11, illustrating finding a longest connected chain of tasks which include a particular task.

A second step of identification 1406 of the critical path is to find 1544 the longest connected chain 540 of tasks, for each task in the relevant DAG(s). This is illustrated in FIG. 12, which shows a TASK1-TASK2 chain, a TASK1-TASK3 chain, a TASK2-TASK3 chain, and a TASK5 chain. For TASK1, TASK2, and TASK3, the longest connected chain is the TASK1-TASK3 chain. For TASK5, the longest connected chain is the TASK5 chain.

The following code illustrates one implementation approach:

```
relevantDags = relevantDags.join(relevantDags[dagId]).select(left.finishtime > right.starttime & left.finishtime < right.finishtime)
```

Figure 13:
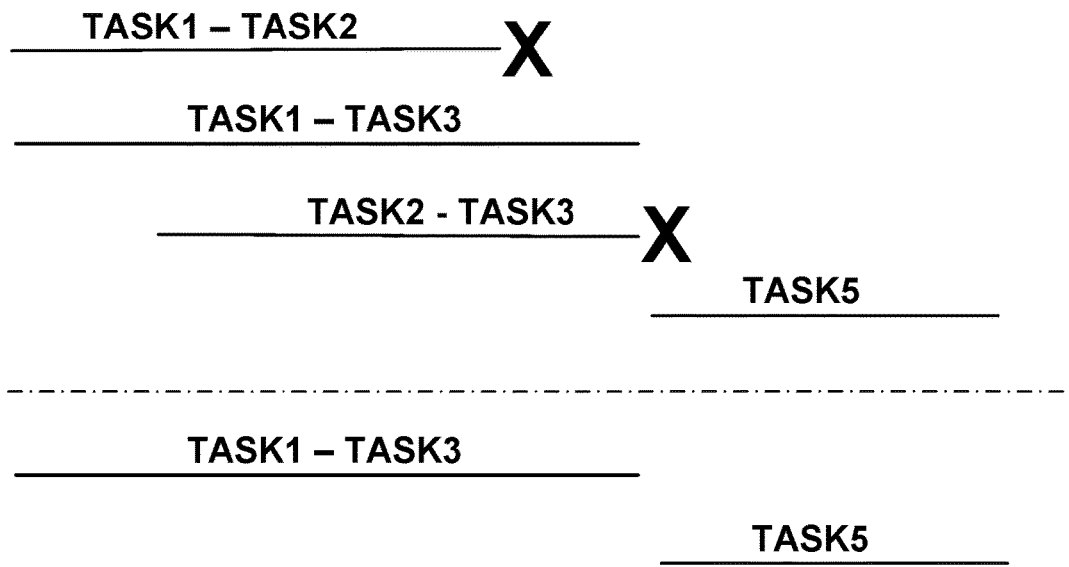
FIG. 13 is a task diagram based on FIG. 12, illustrating removing a subset that is defined by a chain.

A third step of identification 1406 of the critical path is to remove 1546 all subsets formed as part of forming the above-noted chain of tasks. This is illustrated in FIG. 13, which shows removal of the TASK1-TASK2 chain and the TASK2-TASK3 chain.

The following code illustrates one implementation approach:

```
subsetDags = relevantDags.join(relevantDags[dagId]).select(left.starttime < right.starttime & left.finishtime > right.finishtime)
relevantDags = relevantDags – subsetDags
```

Observations about an Experimental Implementation

An experimental prototype was created and executed, consistent with teachings provided herein. This experimental implementation assumed the following: authenticated access to a Kusto™ cluster via https at 1es dot kusto dot windows dot net, access to an AzureDevOps database, relevance determination using a recently executed 604 approach, and a single stage multi-job pipeline for a One-Drive® environment used as a sample (OneDrive and Azure are marks of Microsoft Corporation). Kusto™ functionality includes a service provided by Microsoft for storing and running interactive analytics over big data (mark of Microsoft Corporation).

The following code illustrates the prototyped implementation approach used to select 1404 relevant DAGs:

```
.create-or-alter function with (docstring = 'Create a hash for all DAGs for a pipeline', folder='Duration')
    findLatestDagForDefinition(organizationName: string='onedrive', definitionId: int= 3058, reasonType:string='schedule', duration: timespan=30d, option: string='latest') {
    let Bld =
        cluster("1es").database("AzureDevOps").Build
        | where OrganizationName == organizationName
        | where DefinitionId == definitionId
        | where Reason == reasonType
        | where Result == 'succeeded'
        | where Status == 'completed'
        | where StartTime >= ago(duration)
        | join cluster("1es").database("AzureDevOps").BuildTimelineRecord
            on OrganizationName, ProjectId, RepositoryId, BuildId
        | where Type == 'Task' and isnotempty(TaskId)
        | extend Hash = hash(strcat(RecordName,Order,TaskId.ParentId))
        | project OrganizationName, ProjectId, RepositoryId, BuildId,
    BuildTimelineId, RecordName, Order, StartTime, Reason, Hash, ParentId
        | order by BuildId asc, BuildTimelineId asc, StartTime asc, RecordName asc
        | serialize
        | extend Hash = row_cumsum(Hash, BuildId <> prev(BuildId))
        | extend New = case(BuildId <> next(BuildId), 1, 0)
        | where New == 1;
    Bld
        | sort by Hash asc
        | extend Rank = row_number(1, Hash <> prev(Hash))
        | project OrganizationName, ProjectId, RepositoryId, BuildId,
    BuildTimelineId, Reason, Hash, Rank
            | summarize arg_max(case(option=='latest',BuildId,Rank), Hash)
        | join kind=inner Bld
            on Hash
        | project OrganizationName, ProjectId, RepositoryId, BuildId,
    BuildTimelineId, Reason, Hash
    }
```

The following code illustrates the prototyped implementation approach used to identify 1406 critical paths. To satisfy patent document formatting regulations, the code is divided into sections and white space is modified; the sections are presented in their source code listing order.

The first section includes a findCriticalTasksInDag( ) header:

```
.create-or-alter function with (docstring = 'Create a hash for all DAGs for a pipeline', folder='Duration')
    findCriticalTasksInDag(organizationName: string='onedrive', definitionId: int=3058, reasonType:string='schedule', duration: timespan=30d, durationThreshold: int=60, executionThreshold: decimal=decimal(0.3), topN: int=5) {
```

The next section includes findCriticalTasksInDag( ) body code to find a latest DAG:

```
    let TaskDag =
cluster("KustoLab").database("DevOpsAnalytics").findLatestDagForDefinition(organizationName, definitionId, reasonType, duration)
        | join cluster("1es").database("AzureDevOps").BuildTimelineRecord
                on OrganizationName, ProjectId, RepositoryId, BuildId
        | where Type == 'Task'
        | project OrganizationName, ProjectId, RepositoryId, BuildId, BuildTimelineId, RecordName, StartTime, FinishTime, Duration = datetime_diff('second',FinishTime, StartTime),ParentId
        | where Duration > durationThreshold
        | sort by OrganizationName asc, BuildId asc, BuildTimelineId asc, StartTime asc, Duration desc
        | serialize   | evaluate python(
        typeof(OrganizationName string, ProjectId string, RepositoryId string, BuildId int64, BuildTimelineId string, StartTime_x datetime, FinishTime_x datetime, RecordName_x string, Duration_x int64, ParentId_x string, StartTime_y datetime, FinishTime_y datetime, RecordName_y string, Duration_y int64, ParentId_y string),
        'result = df\n'   'result[\'StartTime\'] = pd.to_datetime(result[\'StartTime\'])\n'
        'result[\'FinishTime\'] = pd.to_datetime(result[\'FinishTime\'])\n'
        'temp = result.merge(result, how=\'left\',
on=[\'OrganizationName\',\'ProjectId\',\'RepositoryId\',\'BuildId\',\'BuildTimelineId\'])\n'
        'rem = temp[(temp[\'StartTime_x\'] < temp[\'StartTime_y\']) & (temp[\'FinishTime_x\'] > temp[\'FinishTime_y\'])]\n'
        'rem = rem[[\'BuildId\',\'RecordName_y\',\'ParentId_y\']]\n'
        'temp = temp.merge(rem, left_on=[\'BuildId\',\'RecordName_x\',\'ParentId_x\'], right_on=[\'BuildId\',\'RecordName_y\',\'ParentId_y\'], how="left", indicator=True).query("_merge != \'both\'").drop(\'_merge\', axis=1).reset_index(drop=True)\n'
        'temp = temp[[\'OrganizationName\',\'ProjectId\',\'RepositoryId\',\'BuildId\',\'BuildTimelineId\',\'StartTime_x\',\'FinishTime_x\',\'RecordName_x\',\'Duration_x\',\'ParentId_x\',\'StartTime_y\',\'FinishTime_y\',\'RecordName_y_x\',\'Duration_y\',\'ParentId_y_x\']]\n'
        'temp.rename(columns = {\'RecordName_y_x\':\'RecordName_y\'}, inplace = True)\n'
        'temp.rename(columns = {\'ParentId_y_x\':\'ParentId_y\'}, inplace = True)\n'
        'temp = temp[(temp[\'FinishTime_x\'] >= temp[\'StartTime_y\']) & (temp[\'FinishTime_x\'] <= temp[\'FinishTime_y\'])]\n'
        'temp[\'Duration\'] = (temp.FinishTime_y - temp.StartTime_x).astype(\'timedelta64[s]\')\n'
        'grp = temp.groupby([\'BuildId\',\'RecordName_x\',\'ParentId_x\'])\n'
        'temp[\'Rank\'] = grp[\'FinishTime_y\'].rank(ascending=False)\n'
        'temp = temp[temp[\'Rank\'] == 1]\n'
        'grp = temp.groupby([\'BuildId\',\'RecordName_y\',\'ParentId_y\'])\n'
        'temp[\'Rank\'] = grp[\'StartTime_x\'].rank(ascending=True)\n'
        'temp = temp[temp[\'Rank\']==1]\n'
        'temp[\'prev_BuildId\'] = temp[\'BuildId\'].shift( )\n'
        'temp.reset_index(inplace = True)\n'
        'for index, row in temp.iterrows( ):\n'
```

```
`          if(row[\'BuildId\'] == row[\'prev_BuildId\']):\n'
`              if(temp.loc[index].at[\'StartTime_x\'] <= temp.loc[index-
1].at[\'StartTime_y\'] and temp.loc[index].at[\'FinishTime_y\'] >= temp.loc[index-
1].at[\'FinishTime_y\']):\n'
`                  temp.at[index-1,\'RecordName_y\'] =
temp.at[index,\'RecordName_x\']\n'
    'result = temp\n' );
```

The last section includes findCriticalTasksInDag( ) body code to find relevant tasks:

```
    let RelevantTasks =
    TaskDag
    | project OrganizationName, ProjectId, RepositoryId, BuildId,
BuildTimelineId, RecordName = RecordName_x , StartTime= StartTime_x,
FinishTime = FinishTime_x , Duration = Duration_x, ParentId = ParentId_x
    | union kind=outer
        (TaskDag
            | project OrganizationName, ProjectId, RepositoryId, BuildId,
BuildTimelineId, RecordName = RecordName_y , StartTime= StartTime_y,
FinishTime = FinishTime_y , Duration = Duration_y, ParentId = ParentId_y)
    | sort by BuildId asc, BuildTimelineId asc, StartTime asc, RecordName asc
    | extend Rank= row_number(1, prev(BuildId) == BuildId and
prev(RecordName) != RecordName)
    | where Rank == 1
    | extend Hash = hash(strcat(RecordName, ParentId))
    | extend Hash = row_cumsum(Hash, BuildId <> prev(BuildId))
    | project OrganizationName, ProjectId, RepositoryId, BuildId,
BuildTimelineId, RecordName, StartTime, FinishTime, Duration, Hash, ParentId;
    RelevantTasks
    | sort by RecordName asc, ParentId asc
    | extend Rank= row_number(1, RecordName <> prev(RecordName) or
ParentId <> prev(ParentId))
    | summarize TotalCount = arg_max(Rank,*) by OrganizationName
    | project TotalCount , OrganizationName
    | join kind=inner ( RelevantTasks
                | summarize Duration = avg(Duration), ExecutionCount = count( )
by RecordName, ParentId, OrganizationName
            )
        on OrganizationName
    | where ExecutionCount * 1.0/ TotalCount > executionThreshold
    | project OrganizationName , RecordName , ParentId , Duration
    | top topN by Duration desc
    }
```

Experimental result validation included picking a pipeline with a single stage and multiple jobs executing in a distributed manner, and viewing results in a Power BI® Desktop tool user interface (mark of Microsoft Corporation). Without application of critical task identification functionality 210 there were over 550 tasks. But after application of critical task identification functionality 210 the number of tasks 502 that may also be critical tasks 312 was reduced to less than 50.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as obtaining digital information representing stochastic pipelines 214, including DAG data structures 204 and execution history data 212, computationally applying 1508 relevance filters 308, computationally identifying 1406 critical paths and indicating 1410 critical tasks, specifying 1530 various kinds of cutoffs 1540 for computational use in an enhanced computing system 202, and computationally finding 1544 task chains, each of which is an activity deeply rooted in computing technology. Some of the technical mechanisms discussed include, e.g., DAG data structures 204, relevance filters 308, task chains 540, pipelines 214, pipeline hierarchies 532, and software repositories 220. Some of the technical effects discussed include, e.g., identification and indication 1410 of critical tasks for use in optimizing stochastic pipelines, and stochastic pipeline performance improvement 208 by optimization of such critical tasks. Thus, purely mental processes are clearly excluded. Other advantages based on the technical characteristics of the teachings will also be apparent to one of skill from the description provided.

Some embodiments described herein may be viewed by some people in a broader context. For instance, concepts such as availability, change, history, importance, order, randomness, or speed may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to improve the performance of stochastic pipelines in software development environments, e.g., by improving the computer technology that schedules computational tasks of a pipeline and assigns computational resources to them. Other configured storage media, systems, and processes involving availability, change, history, importance, order, randomness, or speed are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, development environments, code snippets, operating system environments, feature examples, software processes, development tools, identifiers, data structures, data formats, notations, control flows, naming conventions, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
TCP: transmission control protocol
TPU: tensor processing unit
UDP: user datagram protocol
UEFI: Unified Extensible Firmware Interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Stochastic pipeline improvement option identification operations such as a system 202 obtaining 1402 DAG data structures 204 and execution history information 212, applying 1508 relevance filters to such data structures 204, communicating with 1512 software repositories 220, executing 1510 in a cloud 218, and many other operations discussed herein, are understood to be inherently digital. A human mind cannot interface directly with a CPU or other processor, or with RAM or other digital storage, to read and write the necessary data to perform the stochastic pipeline improvement option identification steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as applying, choosing, determining, eliminating, executing, finding, identifying, improving, indicating, obtaining, reducing, removing, selecting, (and applies, applied, chooses, chose, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment
- 102 computer system, also referred to as a "computational system" or "computing system", and when in a network may be referred to as a "node"
- 104 users, e.g., an analyst or other user of an enhanced system 202
- 106 peripherals
- 108 network generally, including, e.g., clouds, local area networks (LANs), wide area networks (WANs), client-server networks, or networks which have at least one trust domain enforced by a domain controller, and other wired or wireless networks; these network categories may overlap, e.g., a LAN may have a domain controller and also operate as a client-server network
- 110 processor
- 112 computer-readable storage medium, e.g., RAM, hard disks
- 114 removable configured computer-readable storage medium
- 116 instructions executable with processor; may be on removable storage media or in other memory (volatile or non-volatile or both)
- 118 data
- 120 kernel(s), e.g., operating system(s), BIOS, UEFI, device drivers
- 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, enhanced browsers, and so on
- 124 applications, e.g., word processors, web browsers, spreadsheets, games, email tools, commands
- 126 display screens, also referred to as "displays"
- 128 computing hardware not otherwise associated with a reference number 106, 108, 110, 112, 114
- 202 computing system 102 enhanced with functionality 210
- 204 directed acyclic graph digital data structure; also referred to as "directed acyclic graph" or "DAG"
- 206 option for improving pipeline performance, e.g., a likely or actual critical task, or such a critical task together with a particular optimization candidate such as resource usage reduction or execution time reduction
- 208 pipeline performance improvement; also referred to as pipeline performance optimization
- 210 stochastic pipeline performance improvement option identification functionality, e.g., software 304, an implementation of framework 600, or a method 1500
- 212 information about stochastic pipelines, e.g., execution history data such as elapsed time, resource usage, and specific DAG executed
- 214 stochastic pipeline; may also refer to pipelines generally, e.g., when discussing pipelines that are not necessarily stochastic
- 216 cloud-based DevOps environment; also referred to as "cloud-based DevOps"; may also refer to DevOps activities or the personnel and tools that participate in DevOps activities
- 218 cloud computing environment, also referred to as "cloud"
- 220 software repository
- 222 stochasticity, e.g., in a pipeline or set of pipelines
- 302 interface, e.g., software or hardware for communication, e.g., API, network interface
- 304 stochastic pipeline performance improvement option identification software
- 306 pipeline representation, e.g., data structure(s) representing information 212 and specifically including one or more DAGs 204
- 308 relevance filter, e.g., cutoff 1540 and code 304 for applying 1508 the cutoff as a filter
- 310 critical path; may be a likely (based on execution history) or actual critical path in a given pipeline execution
- 312 critical task; may be a likely (based on execution history) or actual critical task in a given pipeline execution
- 400 software development
- 402 pull request build pipeline; also refers to building such a pipeline or building with such a pipeline
- 404 release build pipeline; also refers to building such a pipeline or building with such a pipeline
- 406 continuous integration pipeline; also refers to building such a pipeline or integrating with such a pipeline
- 408 continuous deployment pipeline; also refers to building such a pipeline or deploying with such a pipeline
- 410 continuous test pipeline; also refers to building such a pipeline or testing with such a pipeline 500 aspect of one or more pipelines
502 task
504 hierarchy level
506 resource availability
508 randomness
510 addition of task to pipeline
512 removal of task from pipeline
514 job
516 source code; may be any human-legible code that directs computing activity
518 branch portion of code whose execution depends upon whether a stated condition is satisfied, e.g., IF statements, CASE statements, exception handlers, compiler pragmas, and many other programming mechanisms do or may include branches
520 difference between two source code items
522 stage
524 execution; executing
526 time; may be a point in time or a duration or an interval
528 resource usable by a computing system
530 usage of a resource by a computing system
532 hierarchy of levels in a pipeline
534 dependency relationship between tasks
536 difference between two task dependency relationships
538 conditional execution
540 chain of connected tasks
542 task which is a subset of another task
544 execution cost for executing a task in a computing system
600 stochastic pipeline performance improvement option identification framework
602 most executed relevance filter
604 most recent relevance filter
606 percentile or density relevance filter
1400 flowchart; 1400 also refers to stochastic pipeline performance improvement option identification methods illustrated by or consistent with the FIG. 14 flowchart
1402 computationally obtain pipeline representations, e.g., from a file or over a network
1404 computationally select most relevant representations by applying a filter
1406 computationally identify critical path(s) in relevant representation(s)
1408 computationally choose a critical path
1410 computationally indicate a critical task, e.g., by altering a display, transmitting signal, or writing data electronically
1412 computationally or manually (e.g., by editing code) improve performance of a critical task; this may also improve performance of a pipeline containing the critical task
1500 flowchart; 1500 also refers to stochastic pipeline performance improvement option identification methods illustrated by or consistent with the FIG. 15 flowchart (which incorporates the steps of FIG. 14)
1502 execute a task of a pipeline; this is an example of execution 524
1504 execute a path of tasks of a pipeline; this is an example of execution 524
1506 execute a pipeline; this is an example of execution 524
1508 apply a relevance filter, e.g., by computationally comparing data using a specified 1530 cutoff
1510 execute software in a version-controlled repository development environment
1512 execute software in digital communication with a version-controlled repository development environment
1514 use or perform software version control
1516 reduce task execution time
1518 reduce task resource usage
1520 construct a software development pipeline, e.g., using build or project management tools or a development toolchain
1522 base or perform computation in a cloud 218
1524 differ from another pipeline, e.g., as to the tasks present or their ordering
1526 determine an association between a task or tasks and one or more higher level items, e.g., jobs or stages
1528 an association between a task or tasks and one or more higher level items, e.g., jobs or stages; some examples are shown in FIGS. 7-13
1530 specify a cutoff 1540 for use in or as a relevance filter
1532 time period; also referred to as a time interval
1534 percentile; also referred to as a percentage or as a density value
1536 pipeline DAG used to define membership in a group
1538 numeric cutoff, e.g., number of pipelines which have a corresponding DAG
1540 cutoff for use in or as a relevance filter; may use one or more of 1532, 1534, 1536, or 1538 referenced items, for example
1542 eliminate a subset task from consideration
1544 find a longest connect chain 540
1546 remove a subset
1548 any step discussed in the present disclosure that has not been assigned some other reference numeral

CONCLUSION

In short, the teachings herein provide a variety of pipeline improvement functionalities 210 which operate in enhanced systems 202. Software development 400 pipeline 214 tools 122 construct 1520 pipelines by combining compilers, linkers, version controllers, repositories 220, test suites, and other tools, source files, object files, data 118, processors 110, memory 112, network 108 access, and other resources 528, into pipelines that build 402, 404, integrate 406, test 410, deploy 408, or otherwise implement operational functionality 116, 118 in computing systems 102 and in their components such as applications 124, kernels 120, and a wide variety of tools 122.

Some pipelines 214 are simple, but others are stochastic 222 due to conditional execution 538, task 502 addition 510 or removal 512, resource 528 availability 506 randomness 508, and other causes. Some stochastic pipelines 214 also include a hierarchy 532 with multiple levels 504 of task groupings, e.g., jobs 514 and stages 522, which also adds complexity to the identification 1500 of performance improvement 208 options 206.

Pipeline performance optimization uses critical paths 310 to help ensure that work done to improve individual tasks 502 also improves 1412 overall pipeline or project (multi-pipeline) performance. But it can be technologically challenging to identify critical paths 310 in stochastic 222 pipelines 214, because of the stochasticity 222.

Tools 202 and techniques 1500 are presented herein to automatically identify 1406 likely or actual critical paths 310 and to indicate 1410 constituent critical tasks 312 as improvement options 206 for stochastic 222 pipelines 214 in software development 400 or other industrial activities. Improvement actions 1412 may then be taken manually or automatically to improve 1412 pipeline performance, e.g., by reducing 1516 execution 524 time 526, or by reducing 1518 resource 528 usage 530.

Pipeline representations 306 include directed acyclic graph data structures 204 of constituent tasks 502 and their dependencies 534. Computationally applying 1508 relevance filters 308 and other computational operations discussed herein help select 1404 the most relevant representations 306 and identify 1406 critical paths 310 within them, choose 1408 the most relevant critical paths 310, and indicate 1410 critical tasks 312 as pipeline or project performance improvement options 206 based on historic execution data 212. These functionalities 210, 202, 1500 may be implemented and used advantageously without requiring the kind of predefined task dependency information that PERT or CPM use but stochasticity 222 prevents.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 14 and 15 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system configured for identifying one or more performance improvement options in a group of stochastically constructed software development pipelines, the system comprising:
    a digital memory;
    digital representations of stochastically constructed software development pipelines, each representation residing in the memory, each representation including a directed acyclic graph of constituent tasks of a respective pipeline, each pipeline configured for executing software development operations;
    a processor in operable communication with the memory, the processor configured to perform steps for identifying one or more pipeline performance improvement options, the steps including (a) selecting multiple improvement-relevant representations from the obtained representations by applying at least one improvement-relevance representation filter to at least a portion of the obtained representations, the selecting performed non-parametrically without relying on any assumption that data follows a probability distribution (b) for a particular representation in a plurality of the selected improvement-relevant representations, identifying a critical path of the pipeline which is represented by the particular representation, (c) indicating at least one critical task, the critical task being a pipeline improvement option, in that the critical task is located on at least one critical path of at least one pipeline, and in that a performance improvement of the pipeline is dependent upon a performance improvement of the critical task, (d) choosing a critical path by performing at least one of the following: applying at least one critical path relevance filter, eliminating from consideration a task which is completely a subset of another task within a particular execution instance of a directed acyclic graph, or finding for a particular task in a directed acyclic graph a longest connected chain of tasks which includes the particular task and removing a subset that is defined by the chain, and (e) at least one of the following: improving performance of the pipeline by reducing execution time of the critical task, or improving performance of the pipeline by reducing usage of a computational resource by the critical task.

2. The system of claim 1, wherein the stochastically constructed software development pipelines comprise at least one of the following:
    a pull request build pipeline;
    a continuous integration pipeline;
    a continuous test pipeline;
    a release build pipeline; or
    a continuous deployment pipeline.

3. The system of claim 1, wherein the system executes inside or in communication with a version-controlled software repository.

4. The system of claim 1, wherein the system executes inside or in communication with a cloud-based DevOps environment.

5. The system of claim 1, wherein at least one of the stochastically constructed software development pipelines has a hierarchy of levels, including at least one level that is above a task level that contains tasks of the pipeline.

6. The system of claim 1, wherein at least two of the stochastically constructed pipelines differ from one another due at least in part to at least one of the following: resource availability randomness, conditional execution, task addition, task removal, a difference in task dependency, or use of a different branch of source code.

7. A method for identifying one or more performance improvement options in a group of stochastically constructed software development pipelines, the method comprising:
    obtaining digital representations of stochastically constructed software development pipelines, each representation including a directed acyclic graph of constituent tasks of a respective pipeline, each pipeline configured for executing software development operations;
    selecting multiple improvement-relevant representations from the obtained representations by applying at least one improvement-relevance representation filter to at least a portion of the obtained representations, said selecting comprising applying at least one of the following as an improvement-relevance representation filter: number of instances of a directed acyclic graph within a specified time period, membership of a directed acyclic graph within a group of directed acyclic graphs which includes the directed acyclic graph of a specified pipeline, membership of a directed acyclic graph within a group of directed acyclic graphs which includes at least a specified percentage of the pipelines which correspond to obtained representations, or membership of a directed acyclic graph within a group of directed acyclic graphs which includes at least a specified number of the pipelines which correspond to obtained representations;

for a particular representation in a plurality of the selected improvement-relevant representations, identifying a critical path of the pipeline which is represented by the particular representation;

indicating at least one critical task, the critical task being a pipeline improvement option, in that the critical task is located on at least one critical path of at least one pipeline, and in that a performance improvement of the pipeline is dependent upon a performance improvement of the critical task;

choosing a critical path by performing at least one of the following: applying at least one critical path relevance filter, eliminating from consideration a task which is completely a subset of another task within a particular execution instance of a directed acyclic graph, or finding for a particular task in a directed acyclic graph a longest connected chain of tasks which includes the particular task and removing a subset that is defined by the chain; and at least one of the following: improving performance of the pipeline by reducing execution time of the critical task, or improving performance of the pipeline by reducing usage of a computational resource by the critical task.

8. The method of claim 7, wherein at least two of the stochastically constructed software development pipelines differ from one another due at least in part to at least one of the following: resource availability randomness, conditional execution, a difference in task dependency, or use of a different branch of source code.

9. The method of claim 7, wherein at least two of the stochastically constructed software development pipelines differ from one another due at least in part to at least one of the following: resource availability randomness, or conditional execution.

10. The method of claim 7, wherein the method enhances pipeline performance management using stochastic directed acyclic graphs in that a total number of tasks in the selected improvement-relevant representations is less than one fourth of a total number of tasks in all the obtained representations.

11. The method of claim 7, wherein at least one of the stochastically constructed software development pipelines has a hierarchy of levels which includes a task level that contains tasks of the pipeline, and wherein the method further comprises determining an association between the critical task and at least one higher level item in a level that is above the task level.

12. The method of claim 7, wherein selecting multiple improvement-relevant representations comprises applying at least the following as an improvement-relevance representation filter: number of instances of a directed acyclic graph within a specified time period.

13. The method of claim 7, wherein selecting multiple improvement-relevant representations comprises applying at least the following as an improvement-relevance representation filter: membership of a directed acyclic graph within a specified group of directed acyclic graphs.

14. The method of claim 7, wherein choosing comprises choosing a critical path from among the identified critical paths by performing at least one of the following:
eliminating from consideration a task which is completely a subset of another task within a particular execution instance of a directed acyclic graph; or
for a particular task in a directed acyclic graph, finding a longest connected chain of tasks which include the particular task, and removing a subset that is defined by the chain.

15. The method of claim 7, wherein
a majority of task durations in the selected improvement-relevant representations are based on historical execution data of at least one stochastic pipeline.

16. A computer-readable storage medium configured with data and instructions which upon execution by a processor cause a computing system to perform a method for identifying one or more performance improvement options in a group of stochastically constructed pipelines, the method comprising:

obtaining digital representations of stochastically constructed pipelines, each representation including a directed acyclic graph of constituent tasks of a respective pipeline, each pipeline configured for executing industrial operations;

selecting multiple improvement-relevant representations from the obtained representations by applying at least one improvement-relevance representation filter to at least a portion of the obtained representations, the selecting based at least in part on historical execution data of at least one stochastic pipeline;

for a particular representation in a plurality of the selected improvement-relevant representations, identifying a critical path of the pipeline which is represented by the particular representation; and indicating at least one critical task, the critical task being a pipeline improvement option, in that the critical task is located on at least one critical path of at least one pipeline, and in that a performance improvement of the pipeline is dependent upon a performance improvement of the critical task;

choosing a critical path by performing at least one of the following: applying at least one critical path relevance filter, eliminating from consideration a task which is completely a subset of another task within a particular execution instance of a directed acyclic graph, or finding for a particular task in a directed acyclic graph a longest connected chain of tasks which includes the particular task and removing a subset that is defined by the chain; and at least one of the following: improving performance of the pipeline by reducing execution time of the critical task, or improving performance of the pipeline by reducing usage of a computational resource by the critical task.

17. The computer-readable storage medium of claim 16, further characterized in at least two of the following ways:
the stochastically constructed pipelines include a pull request build pipeline;
the stochastically constructed pipelines include a continuous integration pipeline;
the stochastically constructed pipelines include a continuous test pipeline;
the stochastically constructed pipelines include a release build pipeline;
the stochastically constructed pipelines include a continuous deployment pipeline;
at least one of the stochastically constructed pipelines executes inside or in communication with a version-controlled software repository; or
at least one of the stochastically constructed pipelines executes inside or in communication with a cloud-based DevOps environment.

18. The computer-readable storage medium of claim 16, wherein at least two of the stochastically constructed pipelines differ from one another due at least in part to at least one of the following: task addition, or task removal.

19. The computer-readable storage medium of claim 16, wherein a majority of task dependencies in the selected improvement-relevant representations are based on historical execution data of at least one stochastic pipeline.

20. The computer-readable storage medium of claim 16, wherein performing the method enhances pipeline performance management using stochastic directed acyclic graphs in that a total number of tasks in the selected improvement-relevant representations is less than one eighth of a total number of tasks in all the obtained representations.

* * * * *